(12) United States Patent
Kuppa et al.

(10) Patent No.: US 12,309,695 B2
(45) Date of Patent: May 20, 2025

(54) END OF SERVICE PERIOD INDICATION

(71) Applicant: QUALCOMM Incorporated, San Diego, CA (US)

(72) Inventors: Srikant Kuppa, Fremont, CA (US); Sandip Homchaudhuri, San Jose, CA (US); Yongchun Xiao, San Jose, CA (US); Srinivas Katar, Fremont, CA (US); Rong He, San Diego, CA (US); Ahmed Ragab Elsherif, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/662,644

(22) Filed: May 9, 2022

(65) Prior Publication Data

US 2023/0362811 A1    Nov. 9, 2023

(51) Int. Cl.
  *H04B 7/185*   (2006.01)
  *H04L 1/1607*  (2023.01)
  *H04W 24/10*   (2009.01)
  *H04W 52/02*   (2009.01)
  *H04W 84/12*   (2009.01)

(52) U.S. Cl.
  CPC ....... *H04W 52/0216* (2013.01); *H04L 1/1621* (2013.01); *H04W 24/10* (2013.01); *H04W 52/0274* (2013.01); *H04W 84/12* (2013.01)

(58) Field of Classification Search
  CPC ............. H04W 52/0216; H04W 24/10; H04W 52/0274; H04W 84/12; H04W 52/0229; H04W 52/0219; H04L 1/1621; Y02D 30/70

USPC ........................................................ 370/318
See application file for complete search history.

(56) References Cited

U.S. PATENT DOCUMENTS

| | | | | |
|---|---|---|---|---|
| 9,713,087 | B2* | 7/2017 | Asterjadhi | H04W 28/0221 |
| 10,187,905 | B2* | 1/2019 | Chu | H04W 52/0229 |
| 10,368,309 | B2* | 7/2019 | Kang | H04W 52/0225 |
| 10,694,464 | B2* | 6/2020 | Kim | H04W 74/0833 |
| 10,785,718 | B2* | 9/2020 | Li | H04W 52/0206 |
| 10,791,516 | B1* | 9/2020 | Chu | H04W 52/0216 |
| 10,904,829 | B2* | 1/2021 | Kneckt | H04W 52/0216 |
| 10,993,182 | B2* | 4/2021 | Kim | H04L 5/0053 |
| 11,153,824 | B1* | 10/2021 | Jia | H04W 52/0229 |
| 11,202,258 | B2* | 12/2021 | Ghosh | H04W 28/0221 |
| 11,553,522 | B1* | 1/2023 | Shukla | H04W 74/002 |

(Continued)

OTHER PUBLICATIONS

Asterjadhi A., et al., "LB230-MAC-CR-27.7.5", IEEE Draft, 11-18-0370-02-00AX-LB230-MAC-CR-27-7-5, IEEE-SA Mentor, Piscataway, NJ USA, vol. 802.11ax, No. 2, Mar. 6, 2018, pp. 1-4, XP068125297, CID 13926 Yongho Seok, p. 2.

(Continued)

*Primary Examiner* — Amancio Gonzalez
(74) *Attorney, Agent, or Firm* — Harrity & Harrity LLP / Qualcomm

(57) ABSTRACT

Various aspects of the present disclosure generally relate to wireless communication. In some aspects, an access point may start a target wake time (TWT) service period (SP). The access point may receive an end of SP (EOSP) indication from a station. The access point may stop the TWT SP before a scheduled end of the TWT SP based on receiving the EOSP indication. Numerous other aspects are described.

30 Claims, 24 Drawing Sheets

(56) References Cited

U.S. PATENT DOCUMENTS

| | | | |
|---|---|---|---|
| 11,606,750 B2* | 3/2023 | Ahn | G06F 1/3293 |
| 11,611,935 B2* | 3/2023 | Chu | H04W 52/0216 |
| 11,706,710 B2* | 7/2023 | Patwardhan | H04W 52/0216 |
| | | | 370/338 |
| 11,711,857 B2* | 7/2023 | Huang | H04L 5/0091 |
| | | | 370/329 |
| 11,800,451 B2* | 10/2023 | Ahn | H04L 69/324 |
| 11,838,862 B2* | 12/2023 | Monajemi | H04W 52/0216 |
| 11,864,107 B2* | 1/2024 | Chen | H04W 74/0816 |
| 11,910,225 B2* | 2/2024 | Sehgal | H04W 52/028 |
| 11,943,639 B2* | 3/2024 | Min | H04W 72/04 |
| 12,004,050 B2* | 6/2024 | Wang | H04W 76/40 |
| 12,041,542 B2* | 7/2024 | Chen | H04W 72/52 |
| 12,041,543 B2* | 7/2024 | Kim | H04W 52/028 |
| 12,160,821 B2* | 12/2024 | Shafin | H04W 76/28 |
| 2016/0219510 A1* | 7/2016 | Asterjadhi | H04W 52/0274 |
| 2019/0045438 A1* | 2/2019 | Cariou | H04W 52/0229 |
| 2021/0360646 A1* | 11/2021 | Chu | H04W 72/569 |
| 2022/0183062 A1* | 6/2022 | Seok | H04W 28/0278 |
| 2022/0217638 A1* | 7/2022 | Nayak | H04W 52/0258 |
| 2022/0272544 A1* | 8/2022 | Chitrakar | H04W 48/12 |
| 2022/0346007 A1* | 10/2022 | Alpert | H04W 52/0216 |
| 2022/0361194 A1* | 11/2022 | Shafin | H04W 72/535 |
| 2022/0369232 A1* | 11/2022 | Chen | H04L 47/2441 |
| 2022/0386372 A1* | 12/2022 | Xin | H04W 52/0216 |
| 2023/0021113 A1* | 1/2023 | Shafin | H04W 52/0216 |
| 2023/0032665 A1* | 2/2023 | Wang | H04L 1/1621 |
| 2023/0047705 A1* | 2/2023 | Xin | H04W 74/0808 |
| 2023/0068824 A1* | 3/2023 | Alpert | H04W 52/0216 |
| 2023/0128915 A1* | 4/2023 | Kim | H04L 1/1896 |
| | | | 370/329 |
| 2023/0189359 A1* | 6/2023 | Shafin | H04W 52/0229 |
| | | | 370/311 |
| 2023/0199847 A1* | 6/2023 | Xin | H04W 72/512 |
| | | | 370/329 |
| 2023/0232324 A1* | 7/2023 | Chen | H04W 52/0229 |
| | | | 370/311 |
| 2023/0239798 A1* | 7/2023 | Shafin | H04W 28/0278 |
| | | | 370/338 |
| 2023/0262769 A1* | 8/2023 | Sun | H04W 74/0816 |
| | | | 370/329 |
| 2023/0262770 A1* | 8/2023 | Xin | H04W 74/0833 |
| | | | 370/336 |
| 2023/0308938 A1* | 9/2023 | Sun | H04W 28/0278 |
| 2023/0319902 A1* | 10/2023 | Huang | H04L 5/0091 |
| | | | 370/329 |
| 2023/0389000 A1* | 11/2023 | Dong | H04W 56/0045 |
| 2023/0413332 A1* | 12/2023 | Ouchi | H04W 74/0816 |
| 2024/0040634 A1* | 2/2024 | Kim | H04W 48/14 |
| 2024/0040639 A1* | 2/2024 | Chitrakar | H04W 76/12 |
| 2024/0163916 A1* | 5/2024 | Ryu | H04W 74/0866 |
| 2024/0179744 A1* | 5/2024 | Baek | H04W 74/0808 |
| 2024/0244662 A1* | 7/2024 | Kim | H04W 74/002 |
| 2024/0251443 A1* | 7/2024 | Lu | H04W 74/0866 |
| 2024/0276382 A1* | 8/2024 | Ryu | H04W 52/0229 |
| 2024/0349345 A1* | 10/2024 | Kim | H04W 74/002 |
| 2024/0422674 A1* | 12/2024 | Ryu | H04W 40/244 |

OTHER PUBLICATIONS

International Search Report and Written Opinion—PCT/US2023/063835—ISA/EPO—Jun. 21, 2023.

* cited by examiner

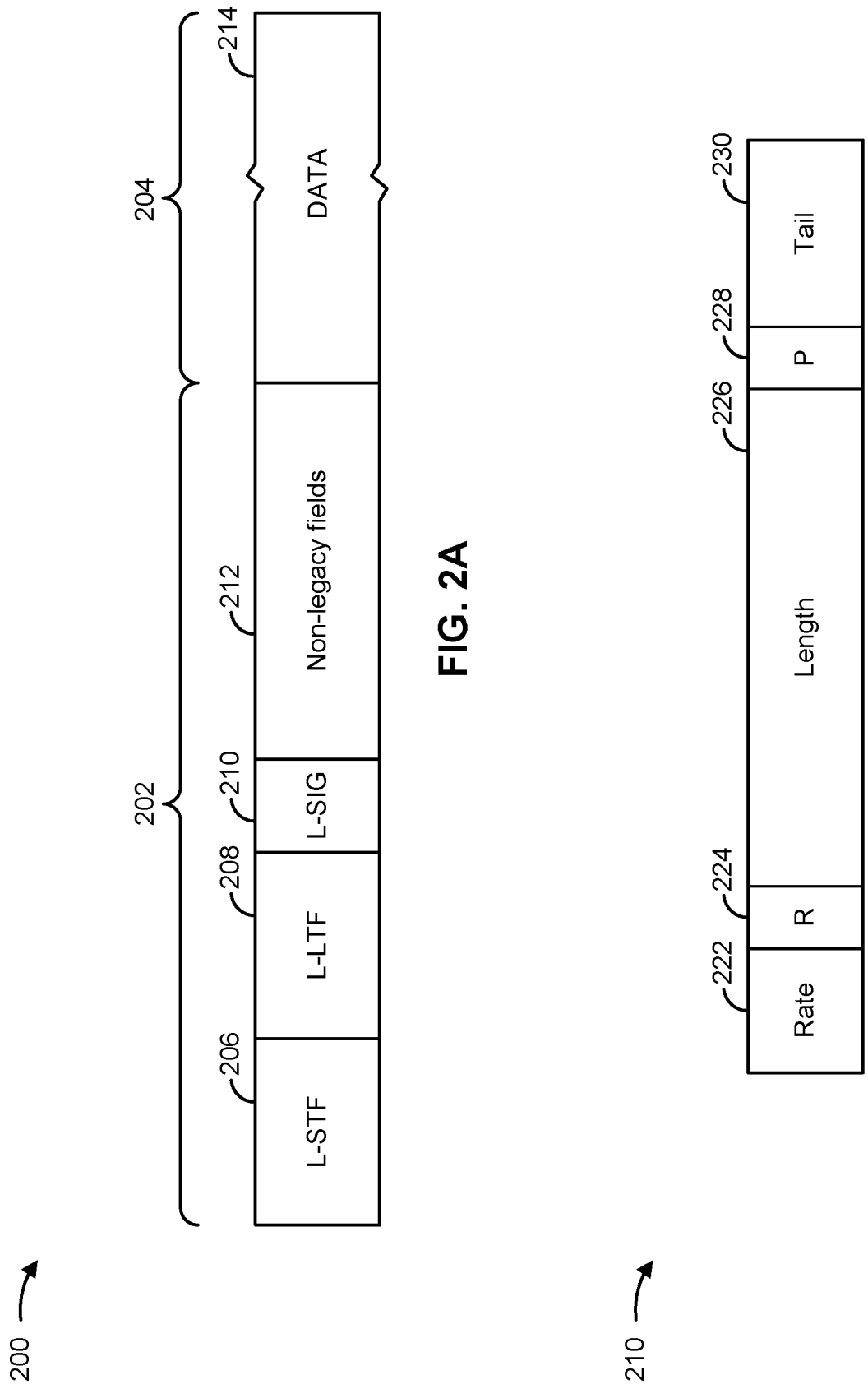

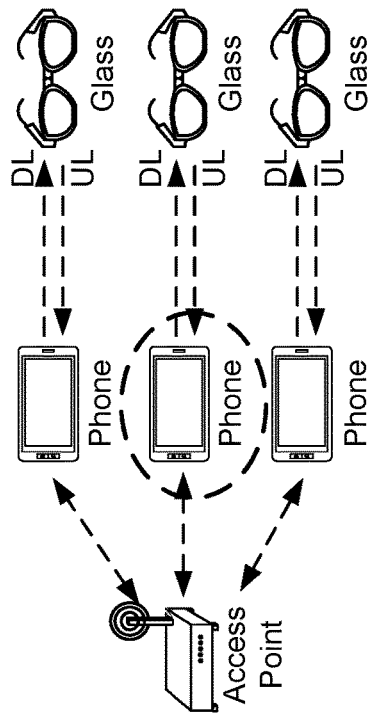
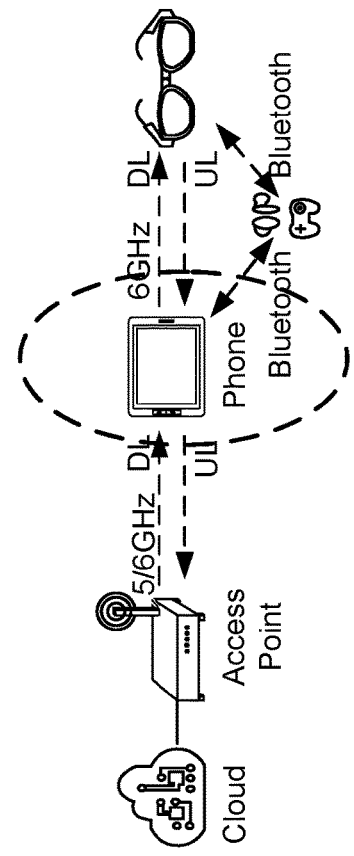
FIG. 9

| Per peer traffic characteristic | EOSP Termination (Current) | GeoSP Termination (New) | |
|---|---|---|---|
| | | Without HW changes | With HW changes |
| Case 1: No DL and UL traffic | DL QoS NULL or QoS Data | DL and UL QoS NULLs | DL QoS NULL |
| Case 2: DL traffic only | | UL QoS NULL | UL ACK/BA response to DL data |
| Case 3: UL traffic only | | DL QoS NULL | DL ACK/BA response to UL data |
| Case 4: Both DL and UL traffic | | Signal EOSP in last data packet | Signal EOSP in last data packet and ACK/BA |

FIG. 15

END OF SERVICE PERIOD INDICATION

FIELD OF THE DISCLOSURE

Aspects of the present disclosure generally relate to wireless communication and to techniques and apparatuses for using end of service period indications.

BACKGROUND

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

To improve data throughput, the AP may communicate with one or more STAs over multiple concurrent communication links. Each of the communication links may be of various bandwidths, for example, by bonding a number of 20 MHz-wide channels together to form 40 MHz-wide channels, 80 MHz-wide channels, or 160 MHz-wide channels. The AP may establish BSSs on any of the different communication links, and therefore it is desirable to improve communication between the AP and the one or more STAs over each of the communication links.

SUMMARY

Some aspects described herein relate to a method of wireless communication performed by an access point. The method may include starting a target wake time (TWT) service period (SP). The method may include receiving a first end of SP (EOSP) indication from a station. The method may include stopping the TWT SP before a scheduled end of the TWT SP based on receiving the first EOSP indication.

Some aspects described herein relate to a method of wireless communication performed by a station. The method may include entering a TWT SP. The method May include transmitting an EOSP indication to an access point before a scheduled end of the TWT SP.

Some aspects described herein relate to an access point for wireless communication. The access point may include a memory and one or more processors coupled to the memory. The one or more processors may be configured to start a TWT SP. The one or more processors may be configured to receive a first EOSP indication from a station. The one or more processors may be configured to stop the TWT SP before a scheduled end of the TWT SP based on receiving the first EOSP indication.

Some aspects described herein relate to a station for wireless communication. The station may include a memory and one or more processors coupled to the memory. The one or more processors may be configured to enter a TWT SP. The one or more processors may be configured to transmit an EOSP indication to an access point before a scheduled end of the TWT SP.

Some aspects described herein relate to a non-transitory computer-readable medium that stores a set of instructions for wireless communication by a one or more instructions that, when executed by one or more processors of an access point. The set of instructions, when executed by one or more processors of the one or more instructions that, when executed by one or more processors of an access point, may cause the one or more instructions that, when executed by one or more processors of an access point to start a TWT SP. The set of instructions, when executed by one or more processors of the one or more instructions that, when executed by one or more processors of an access point, may cause the one or more instructions that, when executed by one or more processors of an access point to receive a first EOSP indication from a station. The set of instructions, when executed by one or more processors of the one or more instructions that, when executed by one or more processors of an access point, may cause the one or more instructions that, when executed by one or more processors of an access point to stop the TWT SP before a scheduled end of the TWT SP based on receiving the first EOSP indication.

Some aspects described herein relate to a non-transitory computer-readable medium that stores a set of instructions for wireless communication by a station. The set of instructions, when executed by one or more processors of the station, may cause the station to enter a TWT SP. The set of instructions, when executed by one or more processors of the station, may cause the station to transmit an EOSP indication to an access point before a scheduled end of the TWT SP.

Some aspects described herein relate to an apparatus for wireless communication. The apparatus may include means for starting a TWT SP. The apparatus may include means for receiving a first EOSP indication from a station. The apparatus may include means for stopping the TWT SP before a scheduled end of the TWT SP based on receiving the first EOSP indication.

Some aspects described herein relate to an apparatus for wireless communication. The apparatus may include means for entering a TWT SP. The apparatus may include means for transmitting an EOSP indication to an access point before a scheduled end of the TWT SP.

Aspects generally include a method, apparatus, system, computer program product, non-transitory computer-readable medium, user equipment, station, access point, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 2A shows an example protocol data unit (PDU) usable for communications between an AP and a number of STAs, in accordance with the present disclosure.

FIG. 2B shows an example field in the PDU of FIG. 2A, in accordance with the present disclosure.

FIGS. 9-10 are diagrams illustrating examples of extended reality topologies, in accordance with the present disclosure.

FIG. 15 is a diagram illustrating an example of a comparison of EOSP termination techniques, in accordance with the present disclosure.

DETAILED DESCRIPTION

Figure 1A:
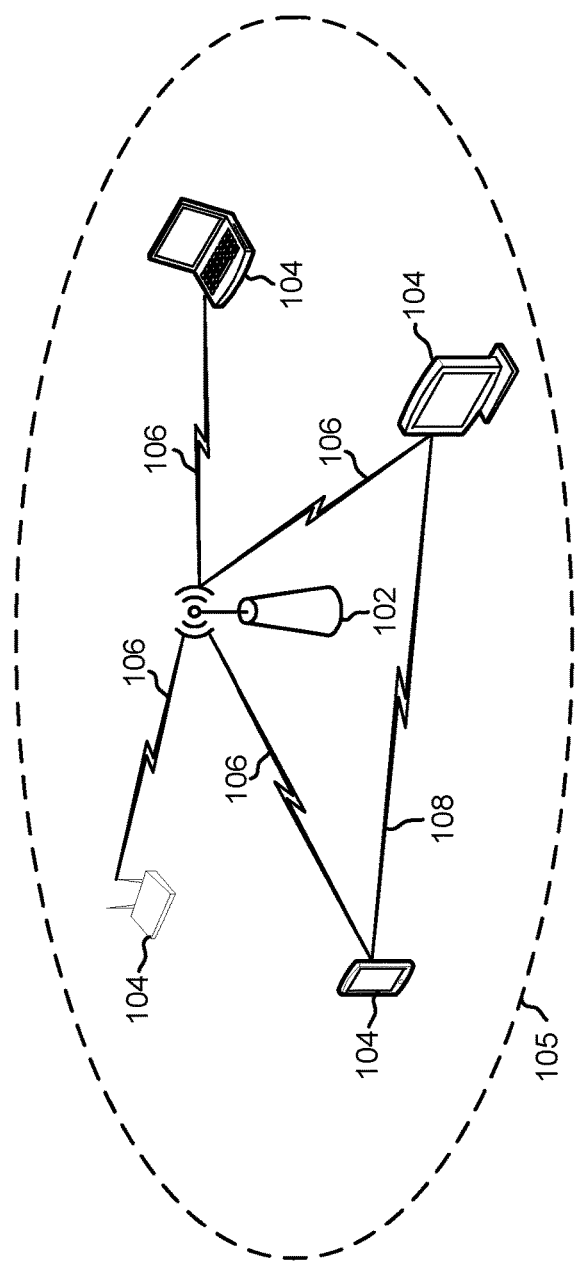
FIG. 1A is a diagram illustrating an example of a wireless communication network, in accordance with the present disclosure.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with Institute of Electrical Engineers (IEEE) standards (e.g., IEEE 802) or 5G or New Radio (NR) radio access technology (RAT), aspects of the present disclosure can be applied to other RATs, such as ultra-wideband (UWB) technologies, a 3G RAT, a 4G RAT, and/or a RAT subsequent to 5G (e.g., 6G).

FIG. 1A shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1A additionally shows an example coverage area 105 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5.0 GHZ, 6.0 GHZ, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on discovery information obtained through the passive or active scans, and to perform authentication and association operations to establish a communication link 106 with the selected AP 102. After authentication, the AP 102 may assign an association identifier (AID) to each associated STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 108. Additionally, two STAs 104 may communicate via a direct communication link 108 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 108 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 1B:
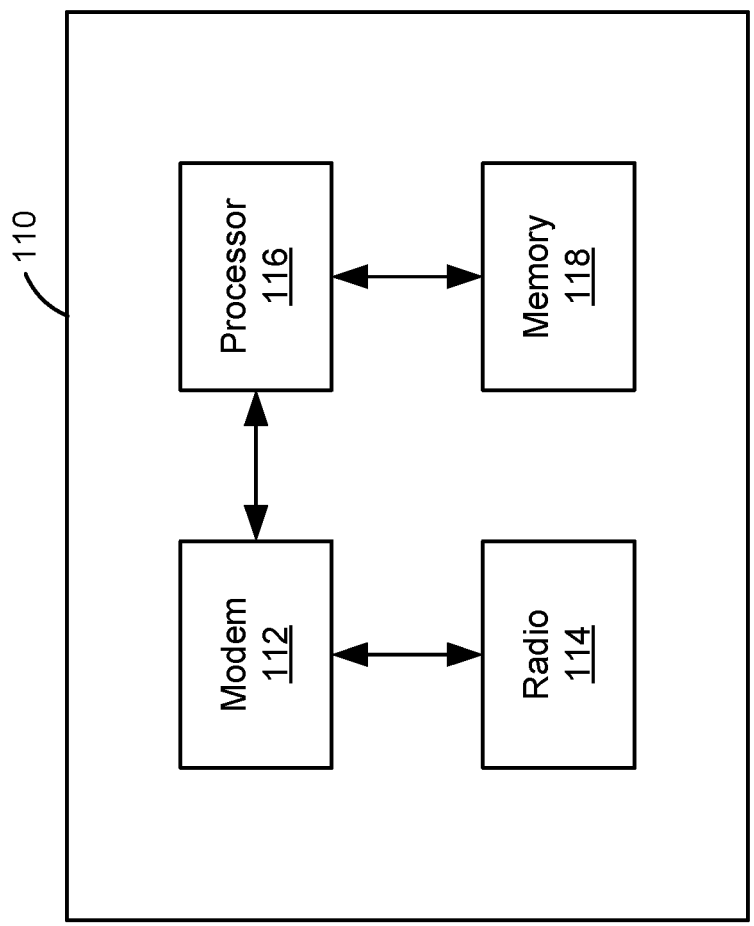
FIG. 1B shows a block diagram of an example wireless communication device, in accordance with the present disclosure.

FIG. 1B shows a block diagram of an example wireless communication device 110. In some implementations, the wireless communication device 110 can be an example of a device for use in a STA such as one of the STAs 104 described above with reference to FIG. 1A. In some implementations, the wireless communication device 110 can be an example of a device for use in an AP such as the AP 102 described above with reference to FIG. 1A. The wireless communication device 110 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 110 can be, or can include, a chip, system on chip (SoC), chipset, package, or device that includes one or more modems 112, for example, a Wi-Fi (IEEE 802.11 compliant) modem. In some implementations, the one or more modems 112 (collectively "the modem 112") additionally include a WWAN modem (for example, a 3GPP 4G LTE or 5G compliant modem). In some implementations, the wireless communication device 110 also includes one or more radios 114 (collectively "the radio 114"). In some implementations, the wireless communication device 116 further includes one or more processors, processing blocks or processing elements 116 (collectively "the processor 116"), and one or more memory blocks or elements 118 (collectively "the memory 118").

The modem 112 can include an intelligent hardware block or device such as, for example, an application-specific integrated circuit (ASIC) among other possibilities. The modem 112 is generally configured to implement a PHY layer. For example, the modem 112 is configured to modulate packets and to output the modulated packets to the radio 114 for transmission over the wireless medium. The modem 112 is similarly configured to obtain modulated packets received by the radio 114 and to demodulate the packets to provide demodulated packets. In addition to a modulator and a demodulator, the modem 112 may further include digital signal processing (DSP) circuitry, automatic gain control (AGC), a coder, a decoder, a multiplexer, and a demultiplexer. For example, while in a transmission mode, data obtained from the processor 116 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 114. In implementations involving beamforming, the modulated symbols in the respective spatial streams are precoded via a steering matrix prior to their provision to the IFFT block.

While in a reception mode, digital signals received from the radio 114 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 116) for processing, evaluation, or interpretation.

The radio 114 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 110 can include, or be coupled with, multiple transmit antennas (each with a corresponding transmit chain) and multiple receive antennas (each with a corresponding receive chain). The symbols output from the modem 112 are provided to the radio 114, which then transmits the symbols via the coupled antennas. Similarly, symbols received via the antennas are obtained by the radio 114, which then provides the symbols to the modem 112.

The processor 116 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 116 processes information received through the radio 114 and the modem 112, and processes information to be output through the modem 112 and the radio 114 for transmission through the wireless medium. For example, the processor 116 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 116 may generally control the modem 112 to cause the modem to perform various operations described above.

The memory 118 can include tangible storage media such as random-access memory (RAM) or read-only memory (ROM), or combinations thereof. The memory 118 also can store non-transitory processor- or computer-executable software (SW) code containing instructions that, when executed by the processor 116, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 1D:
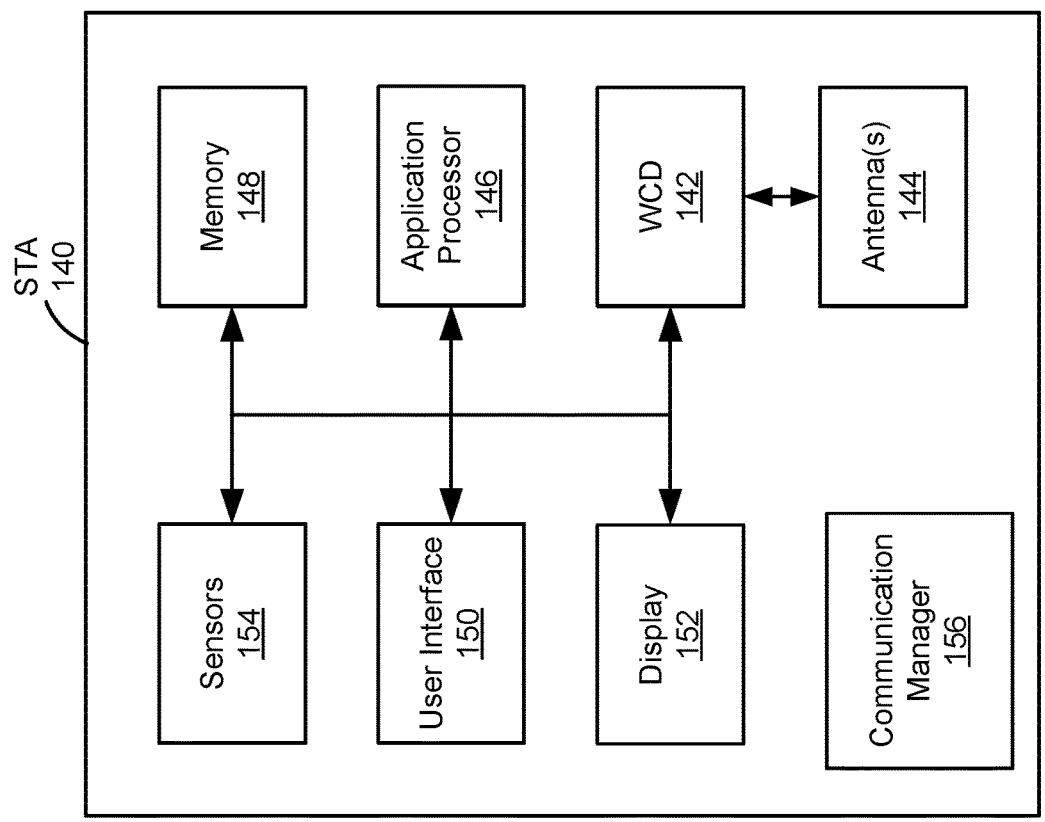
FIG. 1D shows a block diagram of an example station (STA), in accordance with the present disclosure.
Figure 1C:
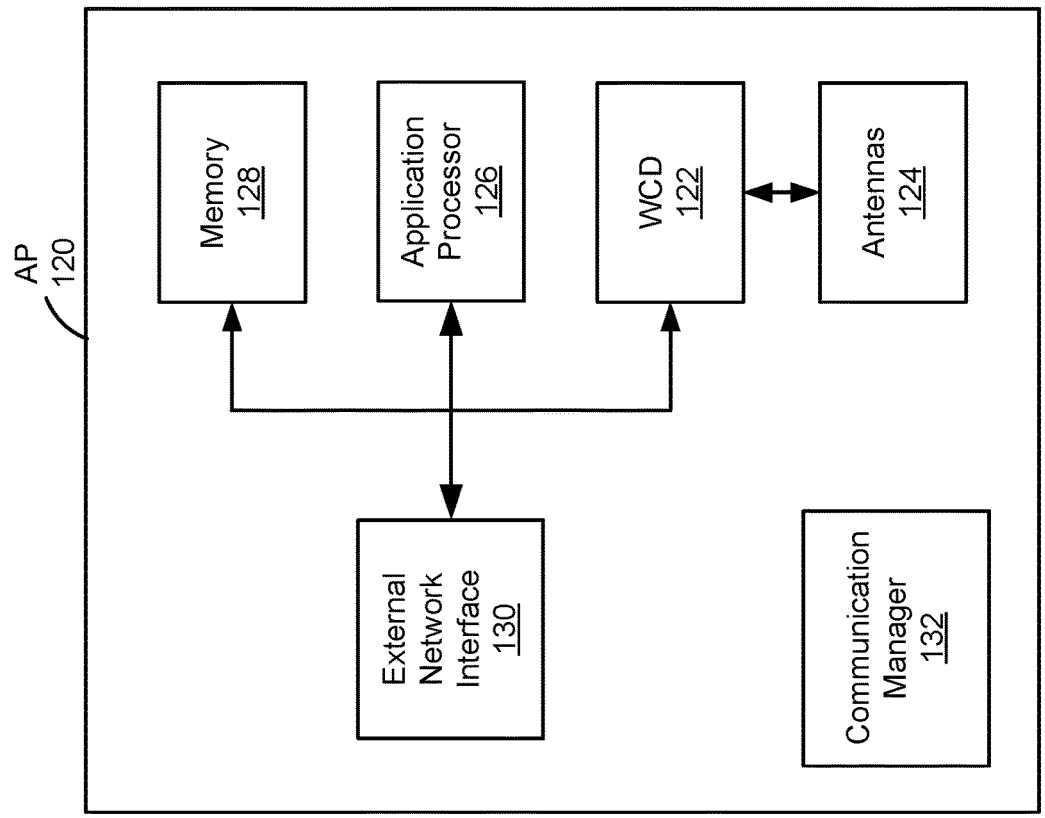
FIG. 1C shows a block diagram of an example access point (AP), in accordance with the present disclosure.

FIG. 1C shows a block diagram of an example AP 120. For example, the AP 120 can be an example implementation of the AP 102 described with reference to FIG. 1A. The AP 120 includes a wireless communication device (WCD) 122. For example, the wireless communication device 122 may be an example implementation of the wireless communication device 110 described with reference to FIG. 1B. The AP 120 also includes multiple antennas 124 coupled with the wireless communication device 122 to transmit and receive wireless communications. In some implementations, the AP 120 additionally includes an application processor 126 coupled with the wireless communication device 122, and a memory 128 coupled with the application processor 126. The AP 120 further includes at least one external network interface 130 that enables the AP 120 to communicate with a core network or backhaul network to gain access to external networks including the Internet. For example, the external network interface 130 may include one or both of a wired (for example, Ethernet) network interface and a wireless network interface (such as a WWAN interface). Ones of the aforementioned components can communicate with other ones of the components directly or indirectly, over at least one bus. The AP 120 further includes a housing that encompasses the wireless communication device 122, the application processor 126, the memory 128, and at least portions of the antennas 124 and external network interface 130.

In some aspects, AP 120 may include a communication manager 132. As described in more detail elsewhere herein, the communication manager 132 may start a target wake time (TWT) service period (SP). The communication manager 132 may receive a first end of SP (EOSP) indication from a station and stop the TWT SP before a scheduled end of the TWT SP based on receiving the first EOSP indication. Additionally, or alternatively, the communication manager 132 may perform one or more other operations described herein.

In some aspects, AP 120 includes means for starting a TWT SP; means for receiving a first EOSP indication from a station; and/or means for stopping the TWT SP before a scheduled end of the TWT SP based on receiving the first EOSP indication. In some aspects, the means for AP 120 to perform operations described herein may include, for example, one or more of communication manager 132, antenna 124, application processor 126, WCD 122, and/or memory 128.

FIG. 1D shows a block diagram of an example STA 140. For example, the STA 140 can be an example implementation of the STA 104 described with reference to FIG. 1A. The STA 140 includes a wireless communication device 142. For example, the wireless communication device 142 may be an example implementation of the wireless communication device 110 described with reference to FIG. 1B. The STA 140 also includes one or more antennas 144 coupled with the wireless communication device 142 to transmit and receive wireless communications. The STA 140 additionally includes an application processor 146 coupled with the wireless communication device 142, and a memory 148 coupled with the application processor 146. In some implementations, the STA 140 further includes a user interface (UI) 150 (such as a touchscreen or keypad) and a display 152, which may be integrated with the UI 150 to form a touchscreen display. In some implementations, the STA 140 may further include one or more sensors 154 such as, for example, one or more inertial sensors, accelerometers, temperature sensors, pressure sensors, or altitude sensors. Ones of the aforementioned components can communicate with other ones of the components directly or indirectly, over at least one bus. The STA 140 further includes a housing that encompasses the wireless communication device 142, the application processor 146, the memory 148, and at least portions of the antennas 144, UI 150, and display 152.

In some aspects, STA 140 may include a communication manager 156. As described in more detail elsewhere herein, the communication manager 156 may enter a TWT SP and transmit an EOSP indication to an access point before a scheduled end of the TWT SP. Additionally, or alternatively, the communication manager 156 may perform one or more other operations described herein.

In some aspects, STA 140 includes means for entering a TWT SP; and/or means for transmitting an EOSP indication to an access point before a scheduled end of the TWT SP. In some aspects, the means for STA 140 to perform operations described herein may include, for example, one or more of communication manager 156, antenna 144, application processor 146, WCD 142, and/or memory 148.

As indicated above, FIGS. 1A-1D are provided as examples. Other examples may differ from what is described with regard to FIG. 1A-1D.

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

FIG. 2B shows an example L-SIG field 210 in the PDU of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 230 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (μs).

As indicated above, FIGS. 2A-2B provide examples. Other examples may differ from what is described with regard to FIGS. 2A-2B.

Figure 3A:
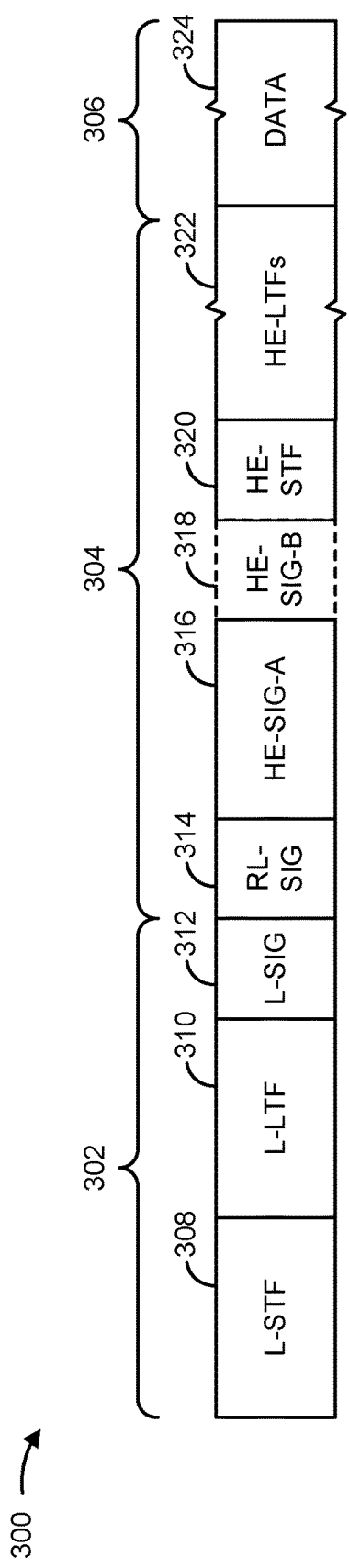
FIG. 3A shows another example PDU usable for communications between an AP and one or more STAs, in accordance with the present disclosure.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
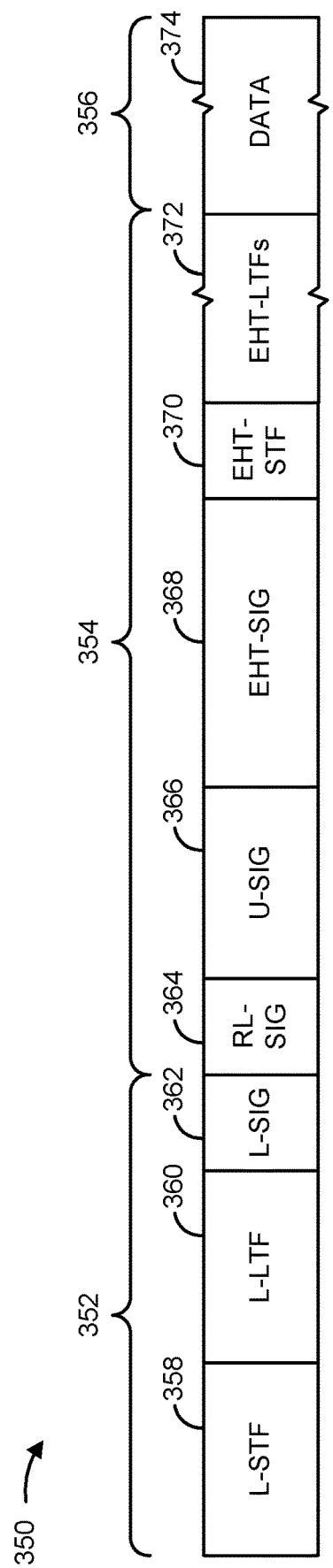
FIG. 3B shows another example PDU usable for communications between an AP and one or more STAs, in accordance with the present disclosure.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As indicated above, FIGS. 3A-3B provide some examples. Other examples may differ from what is described with regard to FIGS. 3A-3B.

Figure 4:
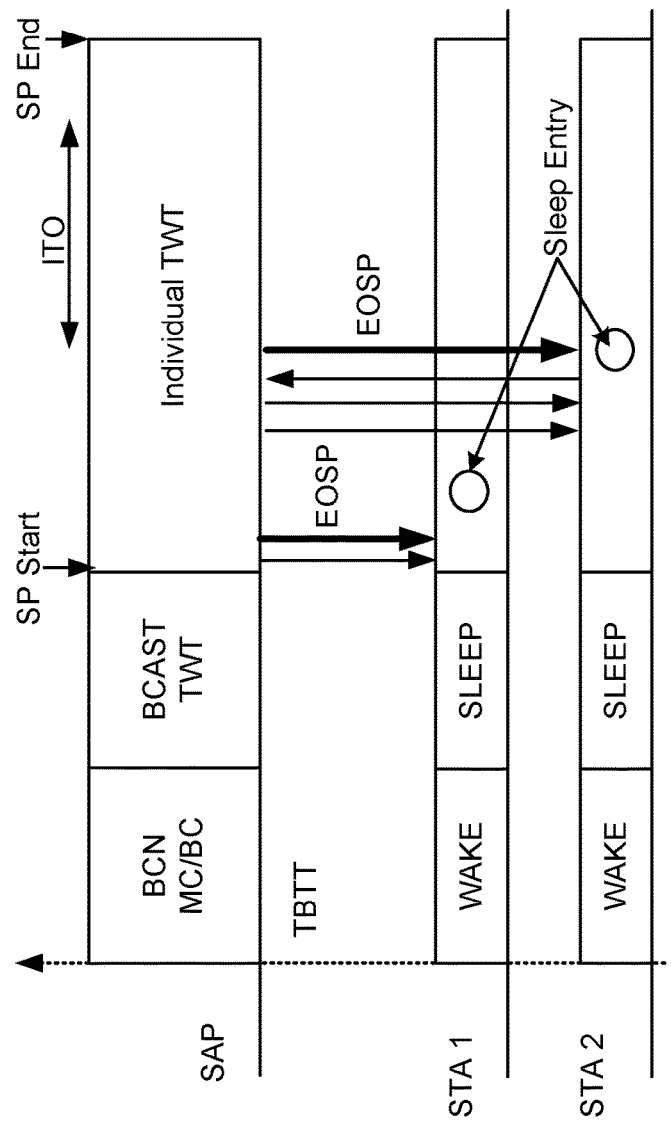
FIG. 4 is a diagram illustrating an example of a target wake time, in accordance with the present disclosure.

FIG. 4 is a diagram illustrating an example 400 of a TWT, in accordance with the present disclosure.

An AP (e.g., AP 120), such as a service or software AP (SAP), may use a TWT to lower power consumption for latency-sensitive and power constrained wireless devices. The TWT may be a time duration when a requesting station (e.g., STA 1) is awake for activity (e.g., for periodic data transmissions). STA 1 (e.g., STA 140) may otherwise sleep. The TWT may be configured or negotiated and may be used for applications such as extended reality (XR) applications and/or PAN applications.

At the beginning of a time interval or service period occasion, such as at the beginning of a TBTT, the SAP may operate in a broadcast core network (BCN) period. The BCN may involve multi-cast (MC) or broadcast (BC) messages. The SAP may then proceed with a broadcast TWT period and then an individual TWT period. An SP may start at the beginning of the individual TWT period (SP Start) and finish at the end of the individual TWT period (SP End) and thus may be referred to as an "TWT SP". The SP End of the TWT SP may be a scheduled end that is scheduled to end after a configured amount of time from the SP Start of the WT SP. That is, the scheduled end may be a configured end according to a configured duration or amount of time for a TWT SP. For example, the scheduled end of the TWT SP may be based on a timer expiring that starts at the SP Start. Stations may be awake during the BCN period and asleep during the broadcast TWT period.

During the TWT SP of the SAP and the TWT SP of STA 1, the SAP may transmit quality of service (QOS) data messages or QoS null messages (no data). STA 1 may transmit an acknowledgment (ACK), a block ACK (BA), or a multi-block ACK (MBA) for such QoS messages. STA 1 may also transmit QoS data messages or QoS null messages. As shown in example 400, the SAP may transmit an EOSP message with a field equal to 1 (e.g., if no data is to be transmitted). STA 1 may enter a sleep (doze) mode after receiving the EOSP message or after a time duration (e.g., AdjustedMinimumTWTWakeDuration) has elapsed from the TWT SP start time as identified by the STA 1, whichever occurs first. STA 1 may also terminate its TWT SP. However, the SAP does not terminate its TWT SP until after an inactivity timeout (ITO).

As indicated above, FIG. 4 is provided as an example. Other examples may differ from what is described with regard to FIG. 4.

Figure 5:
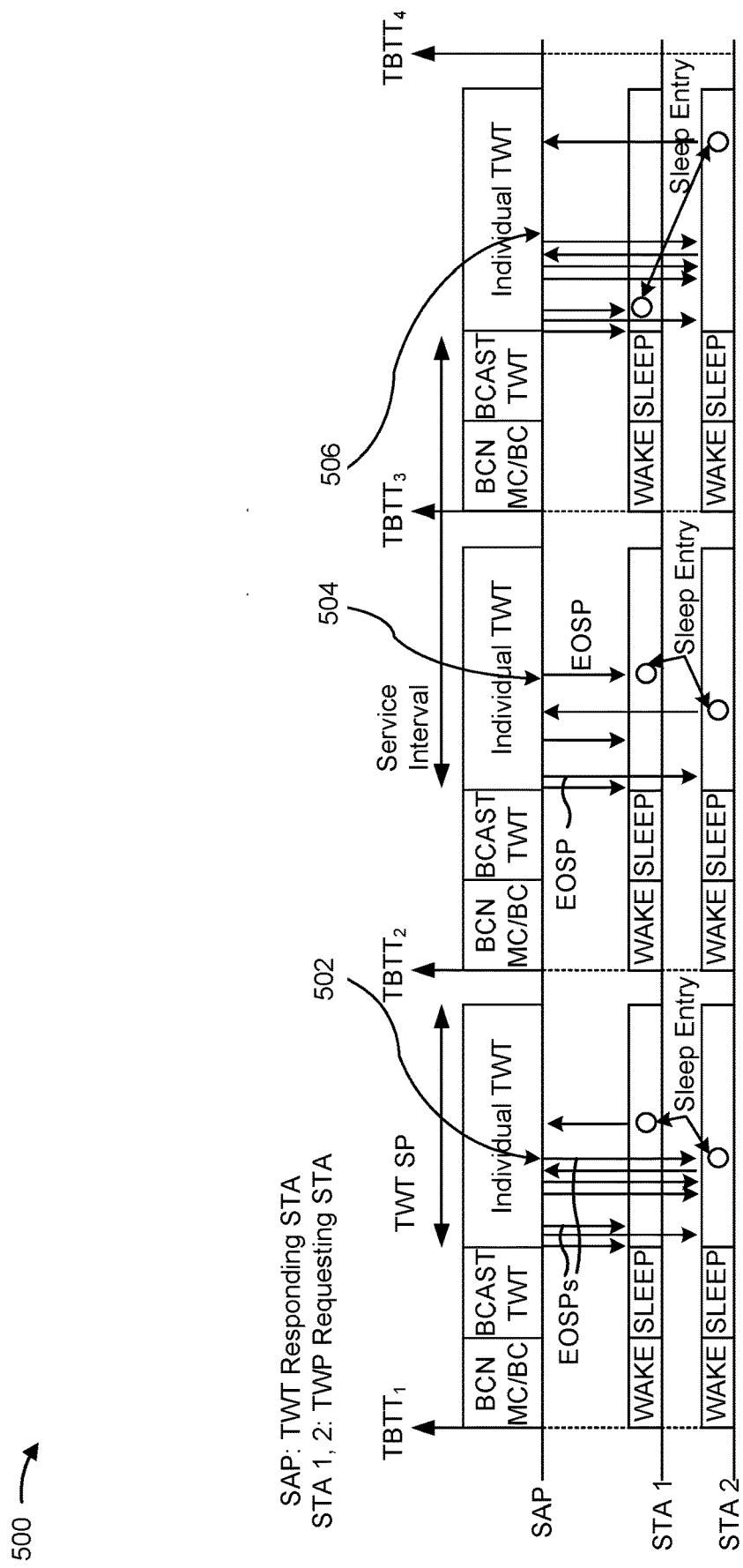
FIG. 5 is a diagram illustrating an example of service periods (SPs), in accordance with the present disclosure.

FIG. 5 is a diagram illustrating an example 500 of SPs, in accordance with the present disclosure.

Example 500 shows multiple TBTTs, each with a TWT SP. A service interval may span from a beginning of a TWT SP to a beginning of a next TWT SP. A smaller service interval provides for less latency but higher power consumption. A larger service interval provides for less power consumption but more latency.

STA 1 and STA 2 may be requesting stations, and the SAP may be a responding station. The SAP may transmit QoS messages and EOSPs to STA 1 and STA 2. For example, the SAP may transmit EOSP 502 to STA 2, and STA 2 may enter a sleep mode. EOSP 504 and EOSP 506 are other examples of EOSPs. However, under this configuration, the SAP cannot terminate its TWT SP (e.g., when EOSPs are only in one direction, from the SAP to the stations) before a scheduled end of the TWT SP. The SAP also cannot perform off-channel or concurrent operations. This reduces a dwell time, which is already limited. The SAP is also expected to remain awake to receive traffic outside of the SP. In each scenario, the SAP consumes more power than necessary.

As indicated above, FIG. 5 is provided as an example. Other examples may differ from what is described with regard to FIG. 5.

Figure 6:
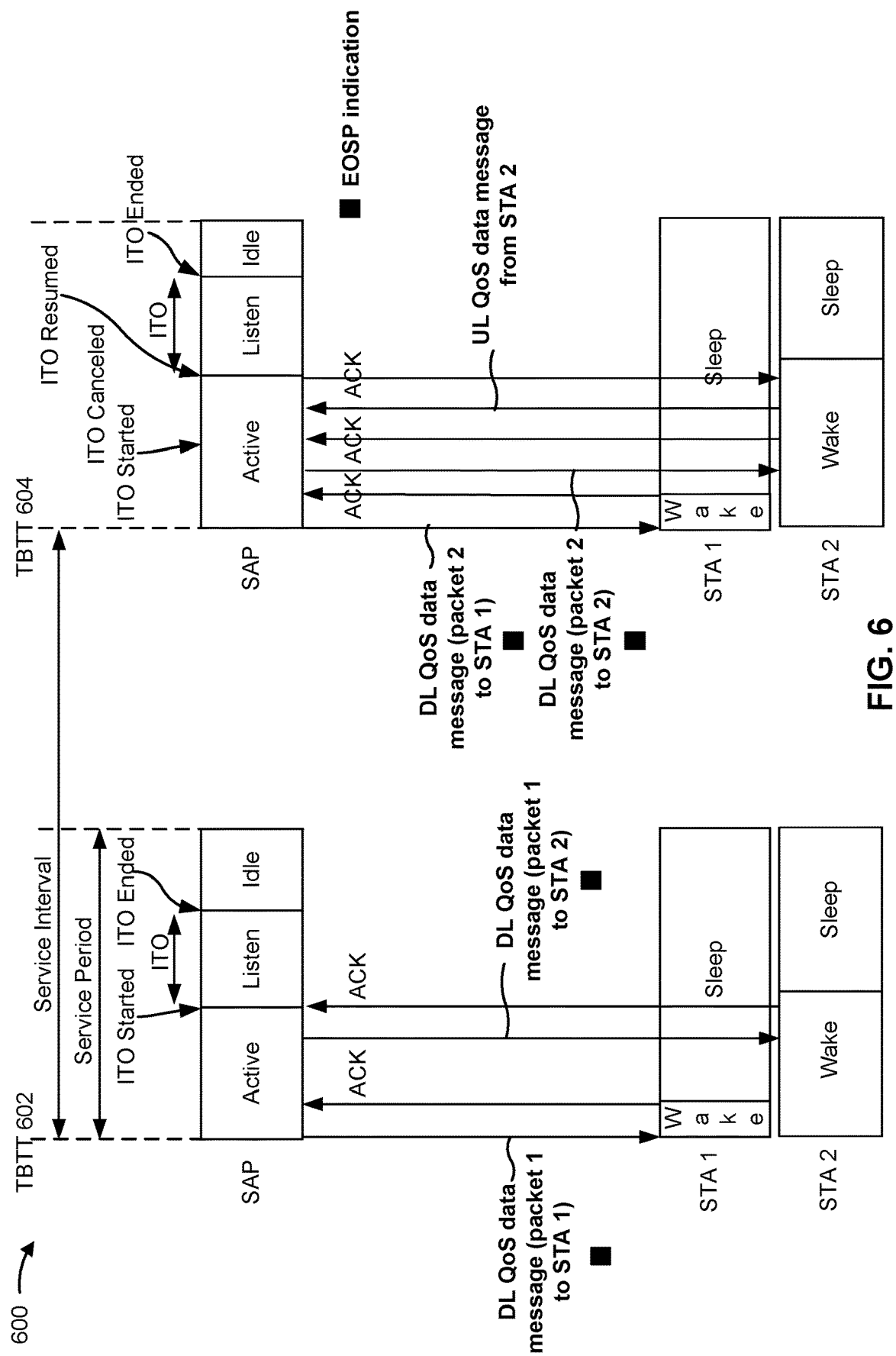
FIG. 6 is a diagram illustrating an example of EOSP timeout, in accordance with the present disclosure.

FIG. 6 is a diagram illustrating an example 600 of EOSP timeout, in accordance with the present disclosure.

Example 600 shows two SPs for the SAP for two TBTTs, TBTT 602 and TBTT 604. During an active part of the SP for TBTT 602, the SAP may transmit a QoS data message with a first packet (packet 1) to STA 1. The SAP may receive an ACK for packet 1. The SAP may transmit a QoS data message with packet 1 to STA 2. The QoS messages are in bold, indicating that they may include EOSP indications that cause the respective station to enter the sleep mode. The SAP may receive an ACK for this packet 1 during a listening part of the SP, which starts an inactivity timer. Note that the ACK is not bold as the ACK from the stations cannot include an EOSP indication.

If no data is to be transmitted and no data is received from any station, the SP may time out after an ITO, which ends the listening part of the SP for the SAP. Now that the SP has timed out, the SAP may be in idle mode, which effectively terminates the SP. A minimum configurable ITO in software of the SAP may be 1 millisecond (ms). For gaming traffic in an extended PAN (XPAN), the TWT SP may be 2 ms and traffic is expected to last for 0.5 to 1 ms. Therefore, it is not even feasible to terminate the SP using ITO in most SPs. Furthermore, the ITO is error prone and not optimal for all SP configurations. During TBTT 604, the ITO may start after transmitting QoS messages. However, the ITO may be canceled when receiving an uplink message and transmitting an ACK. The ITO may then resume and end before an idle period for the SP. Starting, stopping, and resuming an inactivity timer may consume additional processing resources and add latency.

As indicated above, FIG. 6 is provided as an example. Other examples may differ from what is described with regard to FIG. 6.

Figure 7:
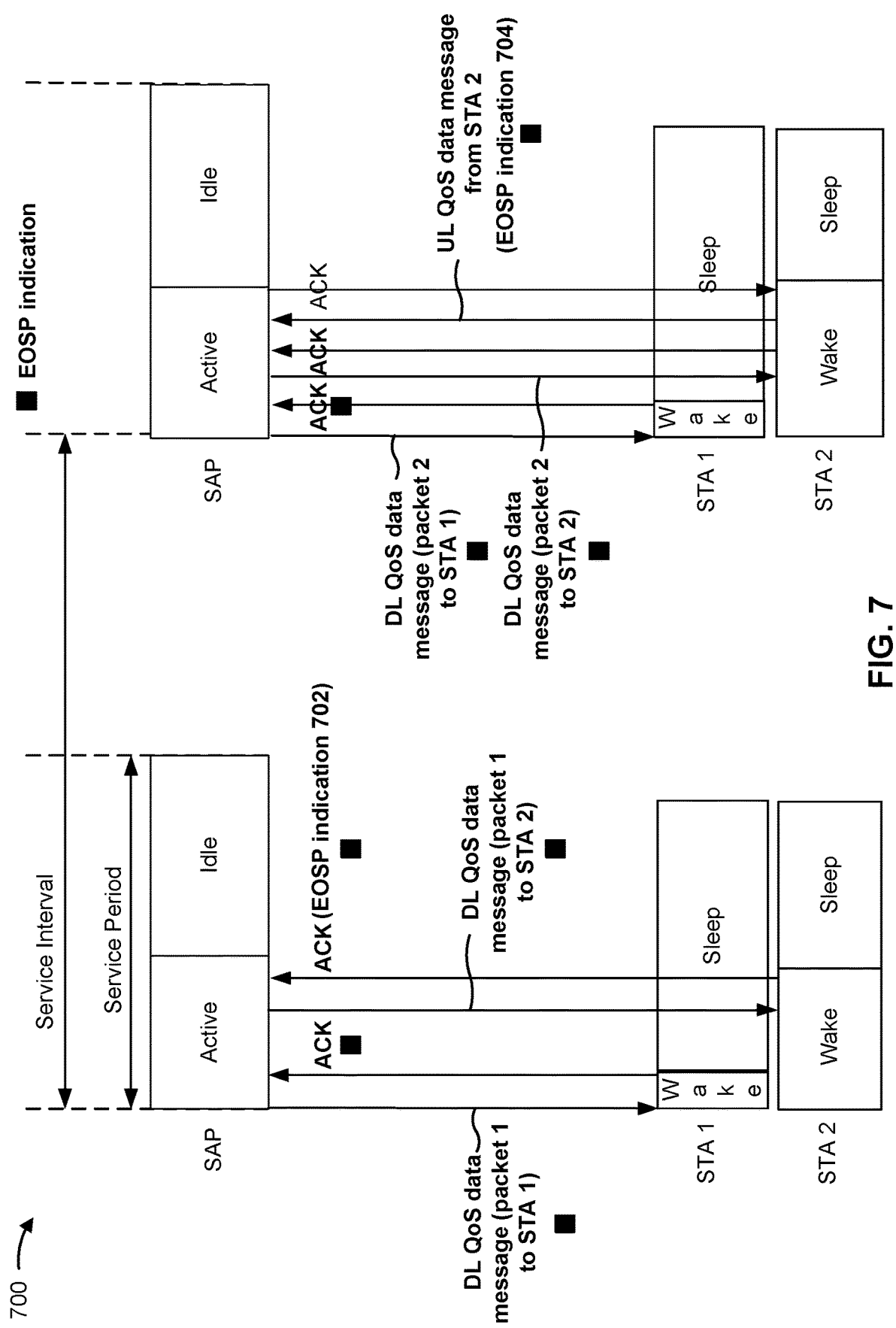
FIG. 7 is a diagram illustrating an example of SP termination using a reverse end of SP (EOSP) indication, in accordance with the present disclosure.

FIG. 7 is a diagram illustrating an example 700 of SP termination using a reverse EOSP indication, in accordance with the present disclosure.

According to various aspects described herein, a station may transmit a EOSP indication (e.g., a reverse EOSP indication) to a SAP. Accordingly, the SAP may receive information indicating the end of the SP that the SAP would otherwise not be made aware of. Receiving this information may allow the SAP to stop a TWT SP before a scheduled end of the TWT SP. Accordingly, the SAP may conserve energy (e.g., by entering sleep mode, refraining from transmitting or receiving) by stopping the TWT SP earlier than scheduled. Additionally, or alternatively, the SAP may perform off-channel or concurrent operations between the reception of the first EOSP indication (termination of the TWT SP) and a scheduled end of the TWT SP by stopping the TWT SP earlier than scheduled, thereby improving performance of the network by reallocating resources for communication.

According to various aspects described herein, each station may transmit an EOSP indication to the SAP. A station may transmit an EOSP if, for example, no more data is to be transmitted. This EOSP from the station may be referred to as a "reverse EOSP indication," as the reverse EOSP indication is in the opposite direction of existing EOSPs, which come only from the SAP. Once the SAP has received an EOSP from each station to which the SAP is connected and that is associated with the TWT SP, the SAP may stop (terminate) the TWT SP and enter the sleep or idle mode. This termination may also be referred to as a "grant-based EOSP termination" or a "GeoSP termination." The reverse EOSP may be part of a light handshake between the SAP and the stations, where a message is sent and an ACK is returned. That is, the reverse EOSP may be included with the existing signaling. For example, the SAP may transmit a QoS data message to STA 2, and STA 2 may transmit an EOSP indication 702 with the ACK to the SAP. The EOSP indication 702 may share a frame with the ACK, be multiplexed with the ACK, or be included in a frame that is configured for the ACK. No new signal is necessary for the EOSP indication 702. In some aspects, STA 2 may repurpose an EOSP subfield in the QoS control field of a QoS data frame or a QoS null frame as a request to terminate the SP. The request may solicit a response. STA 2 may repurpose an existing field or a reserved field in an ACK/BA/MBA to acknowledge the SP termination. This helps to avoid another explicit frame exchange sequence as part of the handshake mechanism. In some aspects, STA 2 may use an information element (IE) during TWT setup or association to specify use of a reverse EOSP indication and/or a repurpose of fields in a QoS data frame, a QoS null frame, and/or an ACK/BA/MBA. Alternatively, STA 1 may transmit an EOSP indication in a frame that is separate from an ACK, a BA, or an MBA.

In some aspects, the station may transmit an EOSP indication in a QoS data message or a QoS null message. Example 700 shows EOSP indication 704 included with an UL QoS data message. All of the messages in example 700, for uplink or downlink, are in bold to indicate that any of these messages may include an EOSP indication. In sum, if the SAP receives EOSPs from all of the stations, the SAP may sleep. If a station receives an EOSP from the SAP, the station may sleep. The station may wait for the EOSP before sleeping.

By entering the sleep or idle mode with a deterministic EOSP before the end of the TWT SP (and earlier than an ITO), the SAP conserves more power. The SAP may also perform off-channel operations (e.g., communications on another channel separate from the stations) or concurrent operations (e.g., switch to another link) earlier. That is, the stations may transmit EOSPs as new signaling, such that EOSPs are transmitted by both the SAP and the stations, and not just from the SAP. The SAP may terminate its TWT SP early, once EOSPs are received from all of the stations associated with the TWT SP.

In some aspects, the SAP may conserve energy (e.g., enter sleep mode, refrain from transmitting or receiving) or perform off-channel or concurrent operations between the reception of the first EOSP indication (termination of the TWT SP) and a scheduled end of the TWT SP. The SAP may also continue to conserve energy or perform other operations between the scheduled end of the of the TWT SP and the start of the next TWT SP. The start of the next TWT SP may be after an end of a service interval.

As indicated above, FIG. 7 is provided as an example. Other examples may differ from what is described with regard to FIG. 7.

Figure 8:
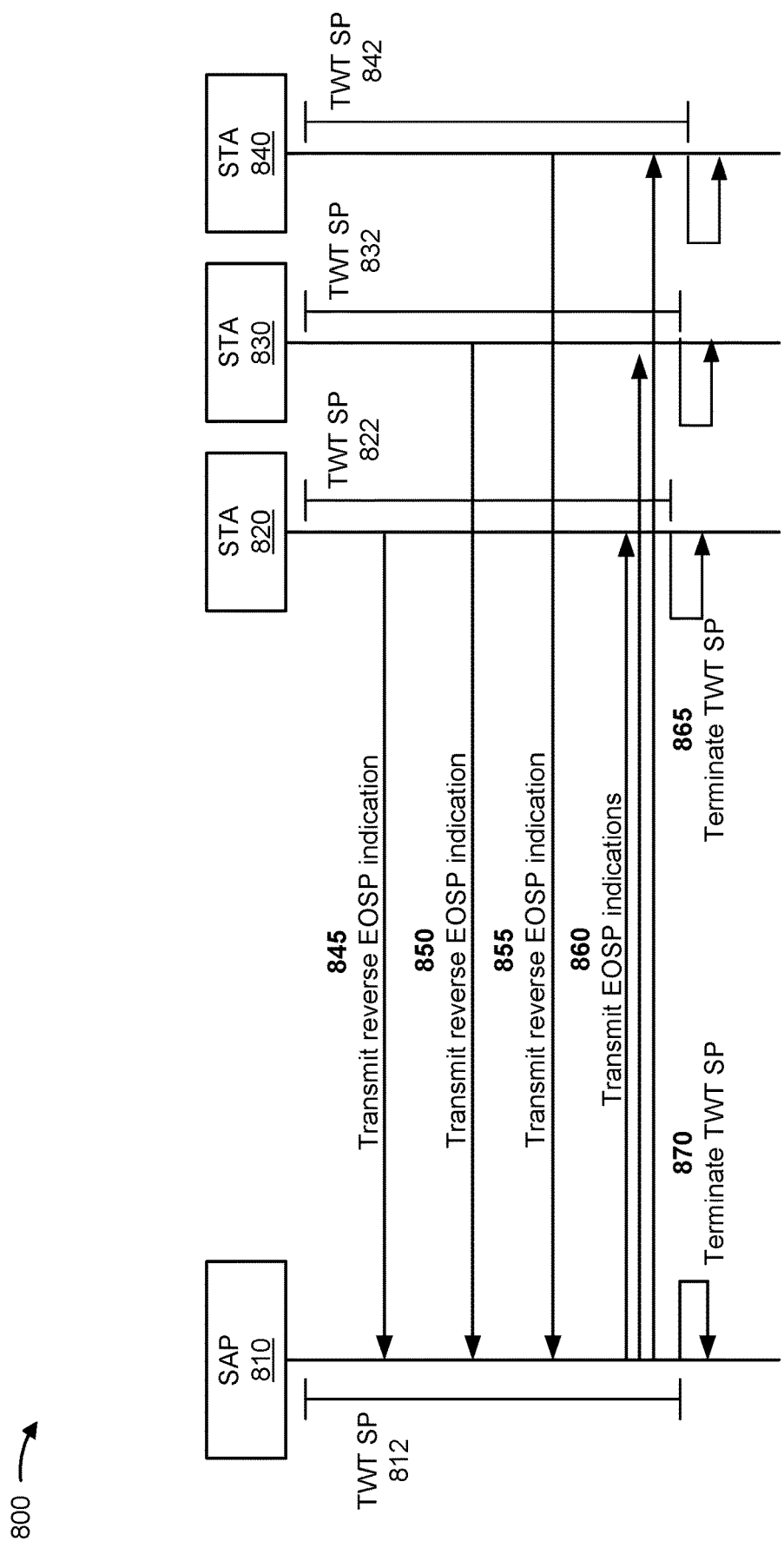
FIG. 8 is a diagram illustrating an example of using a reverse EOSP indications in accordance with the present disclosure.

FIG. 8 is a diagram illustrating an example 800 associated with using reverse EOSP indications, in accordance with the present disclosure. As shown in FIG. 8, an access point, such as SAP 810 (e.g., AP 120), may start a TWT SP 812. The SAP 810 may communicate with a station, such as STA 820 (e.g., STA 140). STA 820 may start a TWT SP 822. The SAP 810 may also communicate with other stations, such as STA 830 (TWT SP 832) and STA 840 (TWT SP 842).

After any data transfers, the stations may have no more data to transmit and may transmit reverse EOSP indications, as shown by reference numbers 845, 850, and 855. For example, STA 820 may transmit a reverse EOSP to SAP 810 based on STA 820 completing transmission of data and/or not having any (more) data to transmit. The SAP 810 may also transmit EOSP indications to the stations, as shown by reference numbers 860, if there is no more data to be transmitted to the stations. As shown by reference number 865, the stations may terminate their respective TWT SPs. For example, each station may terminate a respective TWT SP based on receiving the EOSP indication from SAP 10 and not having any (more) data to transmit. As shown by reference number 870, the SAP 810 may terminate the TWT SP 812 based on EOSP indications being received from all of the stations. For example, SAP 810 may determine whether EOSP indications are received from each station (e.g., STA 820, STA 830, and STA 840). If EOSP indications have not been received from each station (e.g., received from less than all stations associated with or connected to SAP 810), then SAP 810 may continue the TWT SP 812. For example, the SAP 810 may continue the TWT SP 812 until the scheduled end of the TWT SP 812 without early termination if a EOSP is not received from each station before the scheduled end of the TWT SP 812. If EOSP indications are received from each station (e.g., received from all stations associated with or connected to SAP 810), then SAP 810 may terminate the TWT SP 812 (e.g., before a scheduled end of the TWT SP 812).

In some aspects, the reverse EOSP indications are received and TWT SP terminations are implemented via a software application or a service application. In some aspects, the reverse EOSP indications are received via a configured component (e.g., hardware, firmware).

While FIG. 8 illustrates an example where each reverse EOSP indications are transmitted before the EOSP indication from SAP 810, it should be understood that the ordering of this signaling is not limited to this specific example and the reverse EOSP indications and EOSP indications may be transmitted in other orders.

As indicated above, FIG. 8 is provided as an example. Other examples may differ from what is described with respect to FIG. 8.

FIG. 9 is a diagram illustrating an example 900 of XR topologies, in accordance with the present disclosure.

The reverse EOSP indications may be used in various XR scenarios. Example 900 shows some example XR topologies that may involve augmented reality (AR) applications where data is transmitted, for example, between an AP and a smart phone (or other type of computer), and between the smart phone and a peripheral device, such as AR or XR glasses. For example, as shown by Topology 1, the AP may act as the SAP 810 described in connection with FIG. 7 and FIG. 8, and the smartphones may act as the stations. Alternatively, a smart phone (circled) may act as the SAP, and the glasses may act as the station. As shown by Topology 2, if cloud computing is involved, the smartphone (circled) between an AP and glasses may act as the SAP 810.

As indicated above, FIG. 9 is provided as an example. Other examples may differ from what is described with regard to FIG. 9.

Figure 10:
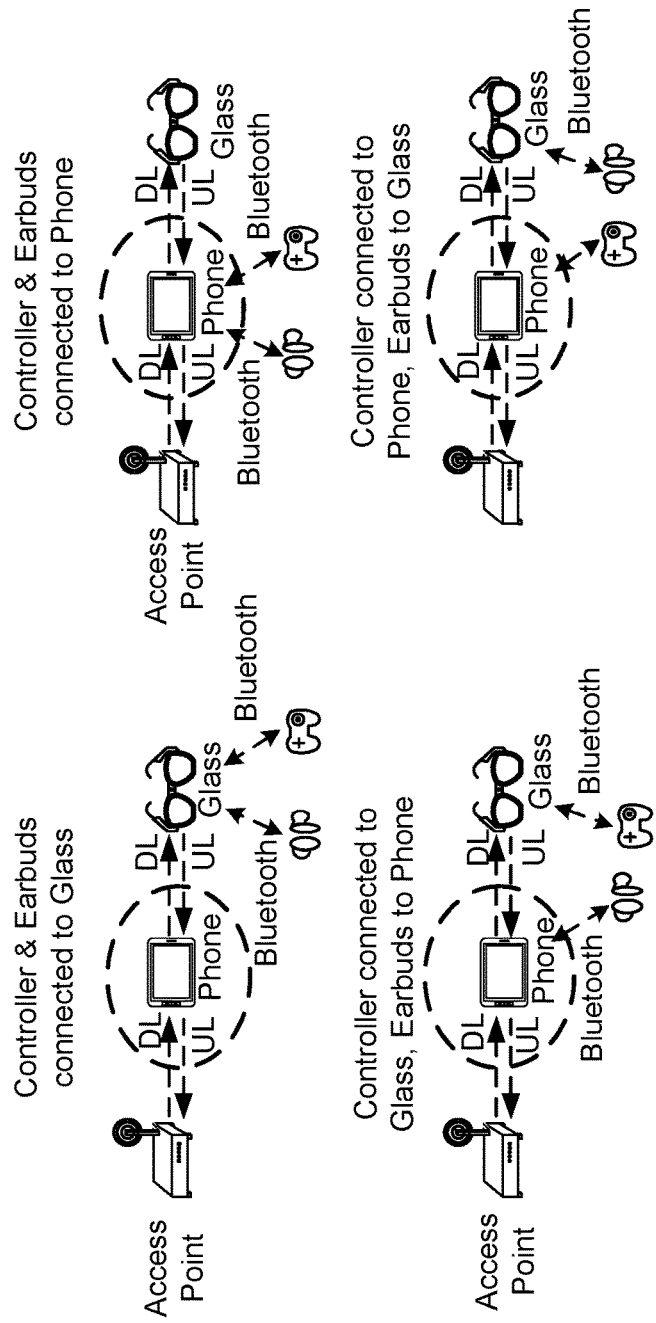

FIG. 10 is a diagram illustrating an example 1000 of more XR topologies, in accordance with the present disclosure.

Example 1000 shows Topology 3 in which various combinations of devices may act as the SAP 810 or the STA 820 described in connection with FIG. 8 and FIG. 8. The smartphone (circled) may act as the SAP 810 that receives the reverse EOSP indications.

As indicated above, FIG. 10 is provided as an example. Other examples may differ from what is described with regard to FIG. 10.

Figure 11:
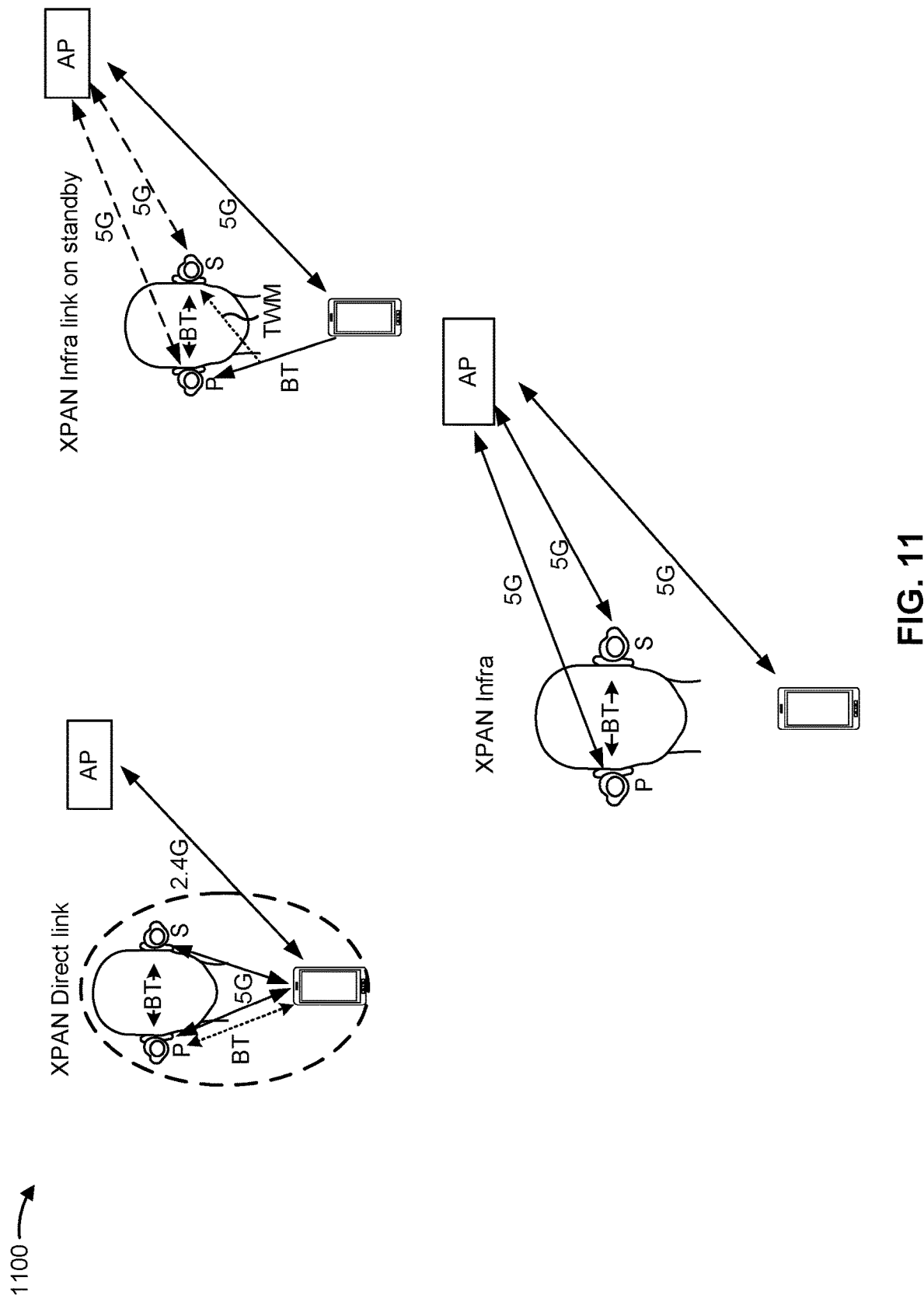
FIGS. 11-12 are diagrams illustrating examples of extended personal area network topologies, in accordance with the present disclosure.

FIG. 11 is a diagram illustrating an example 1100 of XPAN topologies, in accordance with the present disclosure.

The reverse EOSP indications may be used in various XPAN scenarios, which may use some Bluetooth® protocols, shown by "BT" in the example topologies. Stations, such as STA 820 described in connection with FIG. 7 and FIG. 8 may include a smartphone and/or ear buds (circled). Ear buds may include a primary (P) ear bud and a secondary (S) ear bud. The smart phone may also act as an AP such as the SAP 810.

As indicated above, FIG. 11 is provided as an example. Other examples may differ from what is described with regard to FIG. 11.

Figure 12:
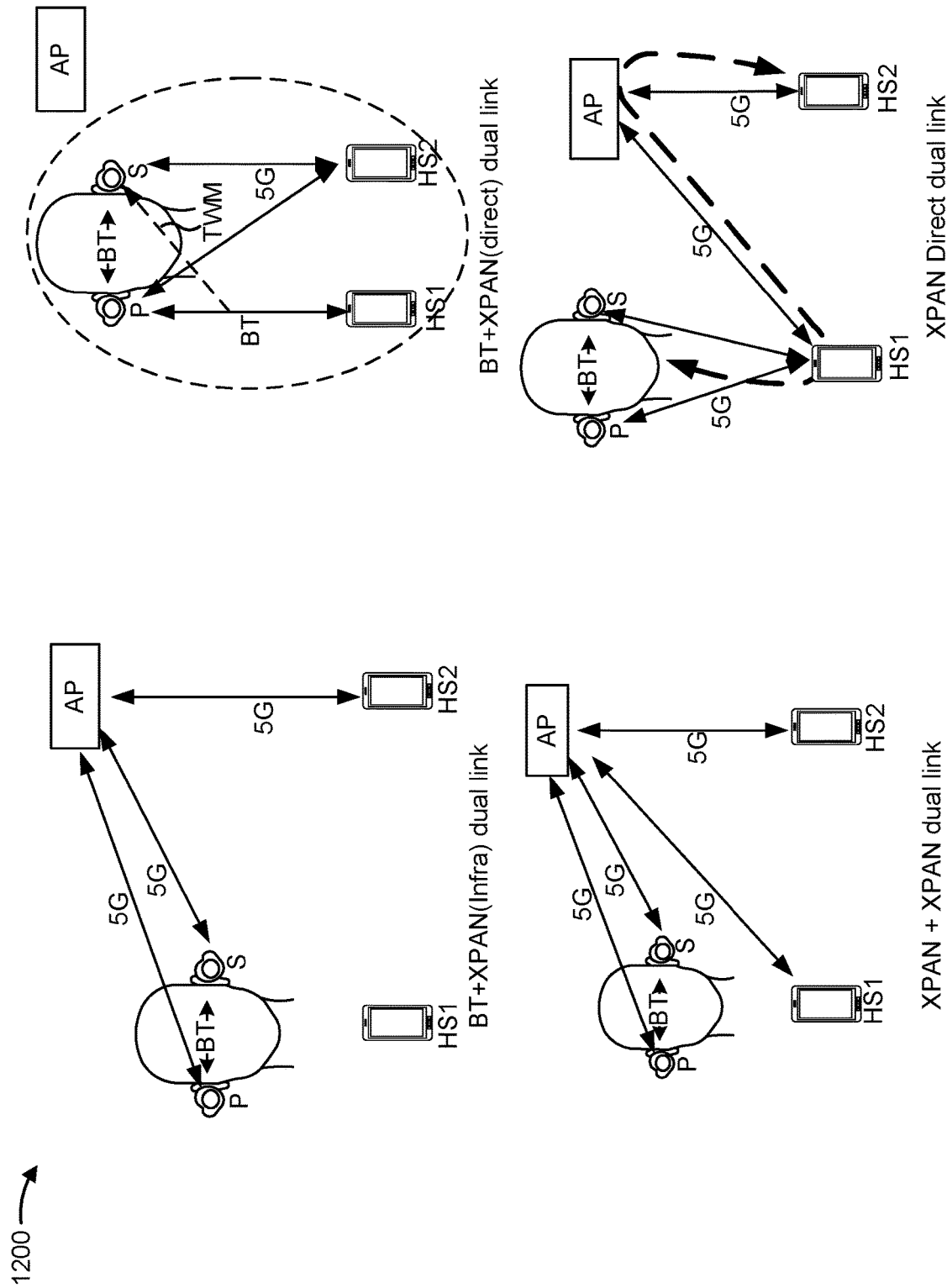

FIG. 12 is a diagram illustrating an example 1200 of more XPAN topologies, in accordance with the present disclosure.

The reverse EOSP indications may be used in various other XPAN scenarios, such as with multiple smartphones and earbuds that operate with true wireless (TWS) techniques. A more likely scenario for reverse EOSP indications is circled.

As indicated above, FIG. 12 is provided as an example. Other examples may differ from what is described with regard to FIG. 12.

Figure 13:
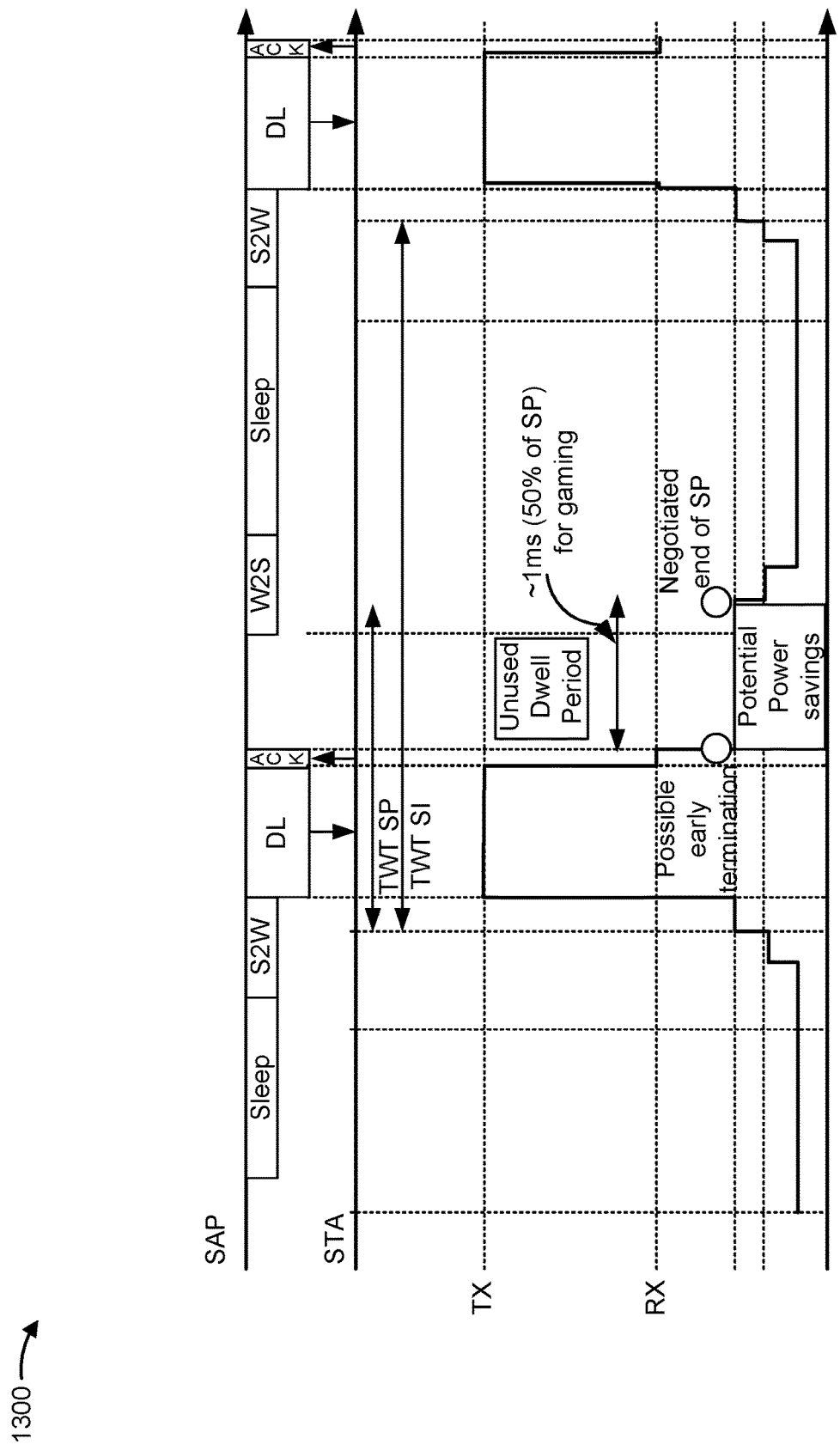
FIG. 13 is a diagram illustrating an example of a power diagram, in accordance with the present disclosure.

FIG. 13 is a diagram illustrating an example 1300 of a power diagram, in accordance with the present disclosure.

Example 1300 shows a power diagram where power savings may occur. Potential power savings may occur after an early termination (reverse EOSP). There may be an unused dwell period.

As indicated above, FIG. 13 is provided as an example. Other examples may differ from what is described with regard to FIG. 13.

Figure 14:
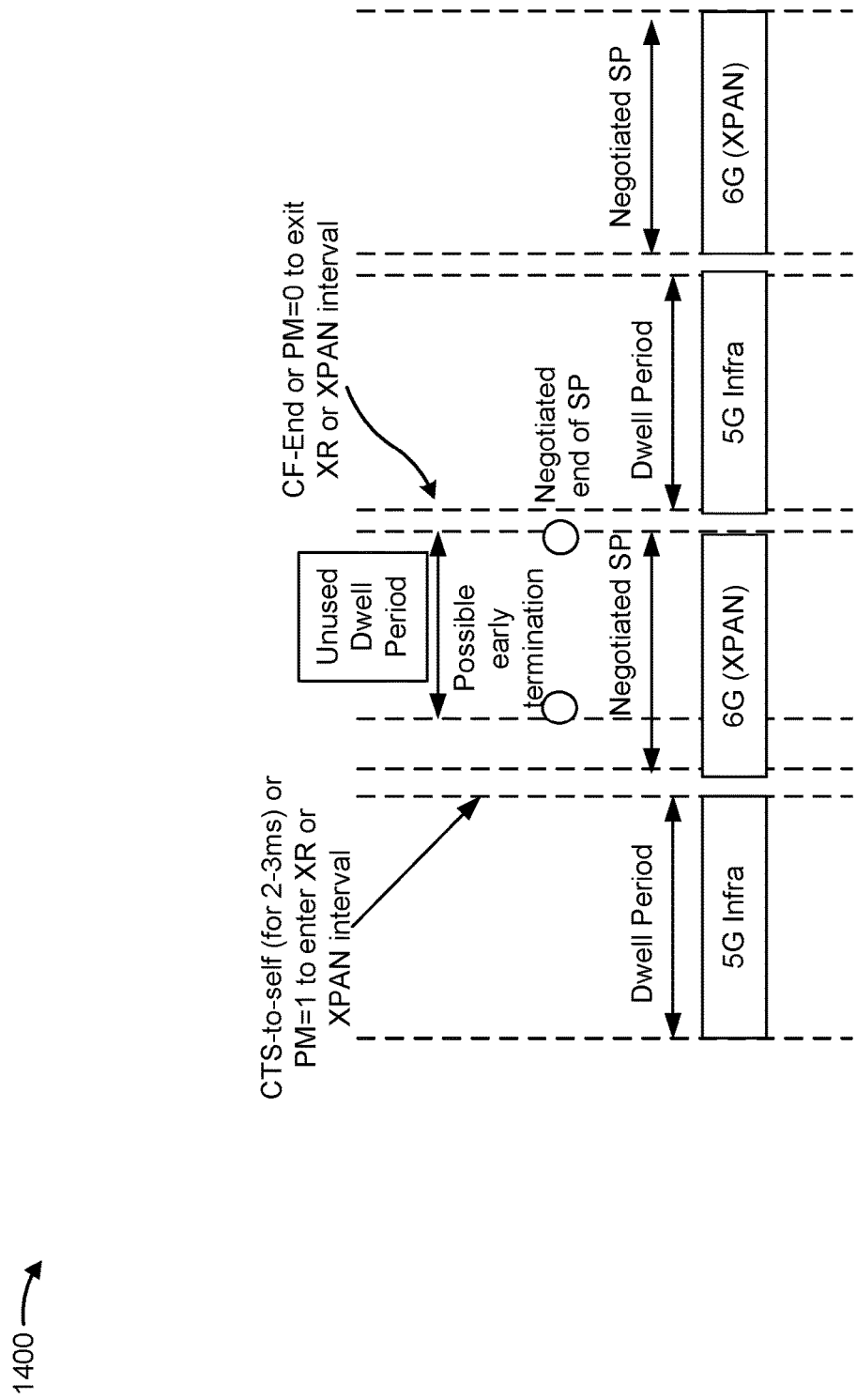
FIG. 14 is a diagram illustrating an example of an impact of early SP termination on concurrent operations, in accordance with the present disclosure.

FIG. 14 is a diagram illustrating an example 1400 of an impact of early SP termination on concurrent operations, in accordance with the present disclosure.

Example 1400 is another diagram that shows an unused dwell period. The unused dwell period may be a time duration that could have been used by an Infra Link (with early termination on XR or XPAN Link). This can be ~50% of negotiated SP (which is 1 ms) for gaming traffic. There may be a 2 to 3 ms clear to send (CTS) to self period to enter XR or an XPAN interval. There may be a contention free (CF) end to exit XR or the XPAN interval.

As indicated above, FIG. 14 is provided as an example. Other examples may differ from what is described with regard to FIG. 14.

FIG. 15 is a diagram illustrating an example 1500 of a comparison of EOSP termination techniques, in accordance with the present disclosure.

Figure 16A:
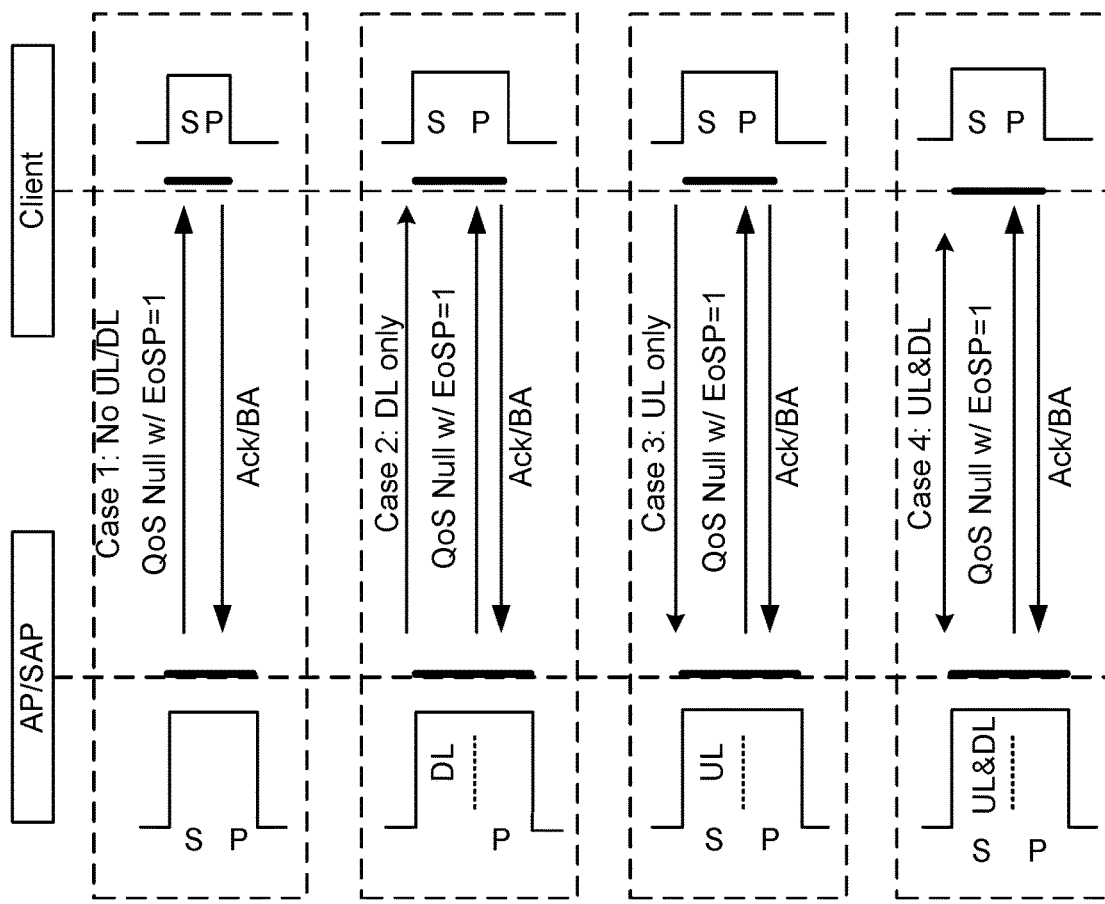
FIG. 16A, FIG. 16B, and FIG. 16C are diagrams illustrating a comparison of EOSP termination techniques, in accordance with the present disclosure.

Example 1500 shows a table that is associated with FIGS. 16*a*, 16, B, and 16C. The table may summarize an over-the-air frame exchange sequence to signal a reverse EOSP indication. If there is no downlink (DL) traffic from the AP to the station or no uplink (UL) traffic from the station to the AP, a software implementation (without hardware changes) may use DL and UL QoS null messages for reverse EOSPs. A hardware implementation (e.g., configured component) may use a DL QoS null message.

If there is DL traffic only, a software implementation may use an UL QOS null message for reverse EOSP indications, and a hardware implementation may use UL ACK/BAs for reverse EOSP indications.

If there is UL traffic only, a software implementation may use a DL QoS null message for reverse EOSP indications, and a hardware implementation may use DL ACK/BAs for reverse EOSP indications.

If there is both DL and UL traffic, a software implementation may use a last data packet or frame for reverse EOSP indications, and a hardware implementation may use an ACK/BA or a last packet or frame for reverse EOSP indications.

As indicated above, FIG. 15 is provided as an example. Other examples may differ from what is described with regard to FIG. 15.

Figure 16B:
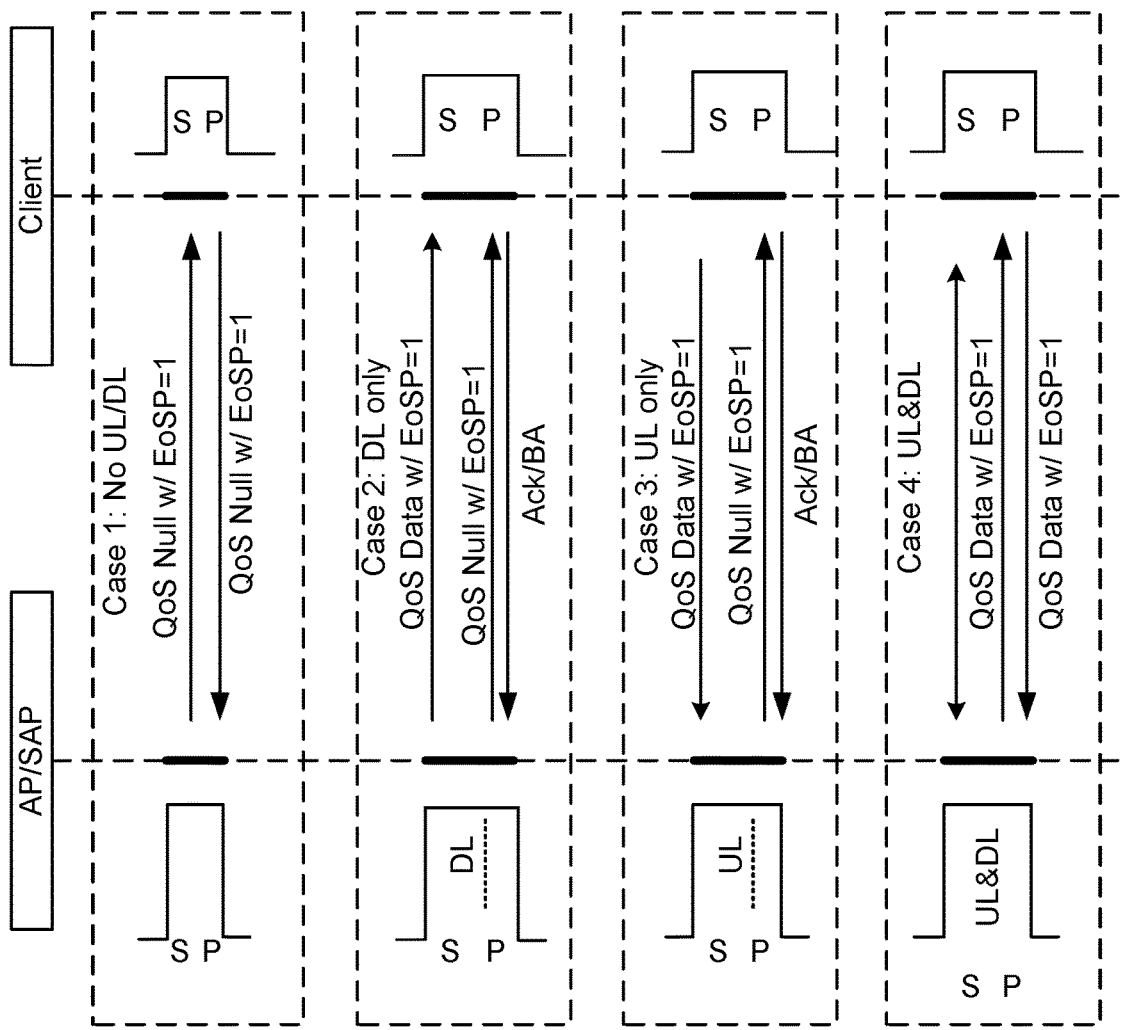
Figure 16C:
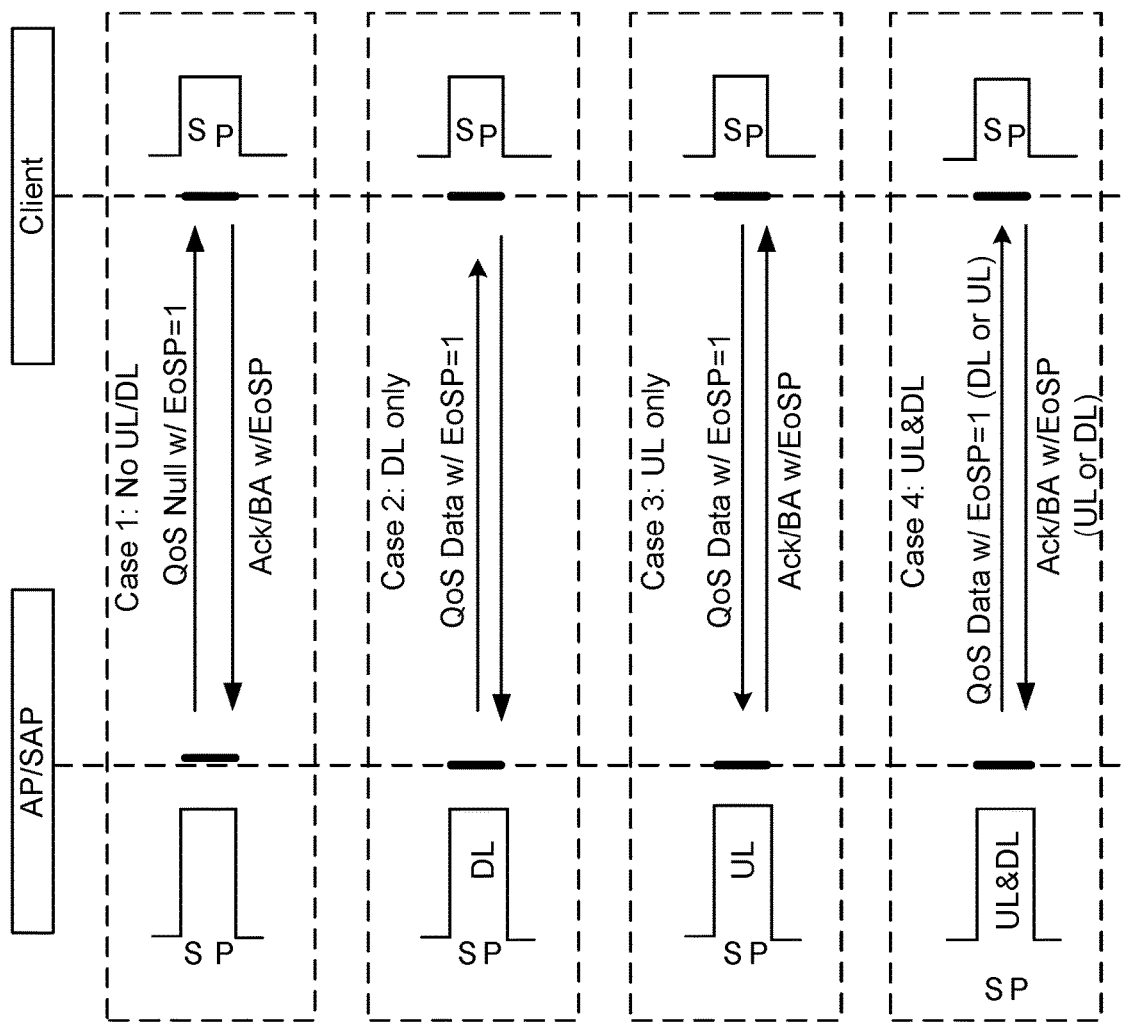

FIG. 16A, FIG. 16B, and FIG. 16C are diagrams illustrating a comparison of EOSP termination techniques, in accordance with the present disclosure.

FIG. 16A shows current signaling without reverse EOSP indications. An EOSP field value of 1 indicates an EOSP. There are no reverse EOSP indications. FIG. 16B shows examples of a software implementation of reverse EOSP indications described in connection with FIG. 15. FIG. 16C shows examples of a hardware implementation of reverse EOSP indications described in connection with FIG. 15.

As indicated above, FIG. 16B and FIG. 16C provide examples. Other examples may differ from what is described with regard to FIG. 16.

Figure 17:
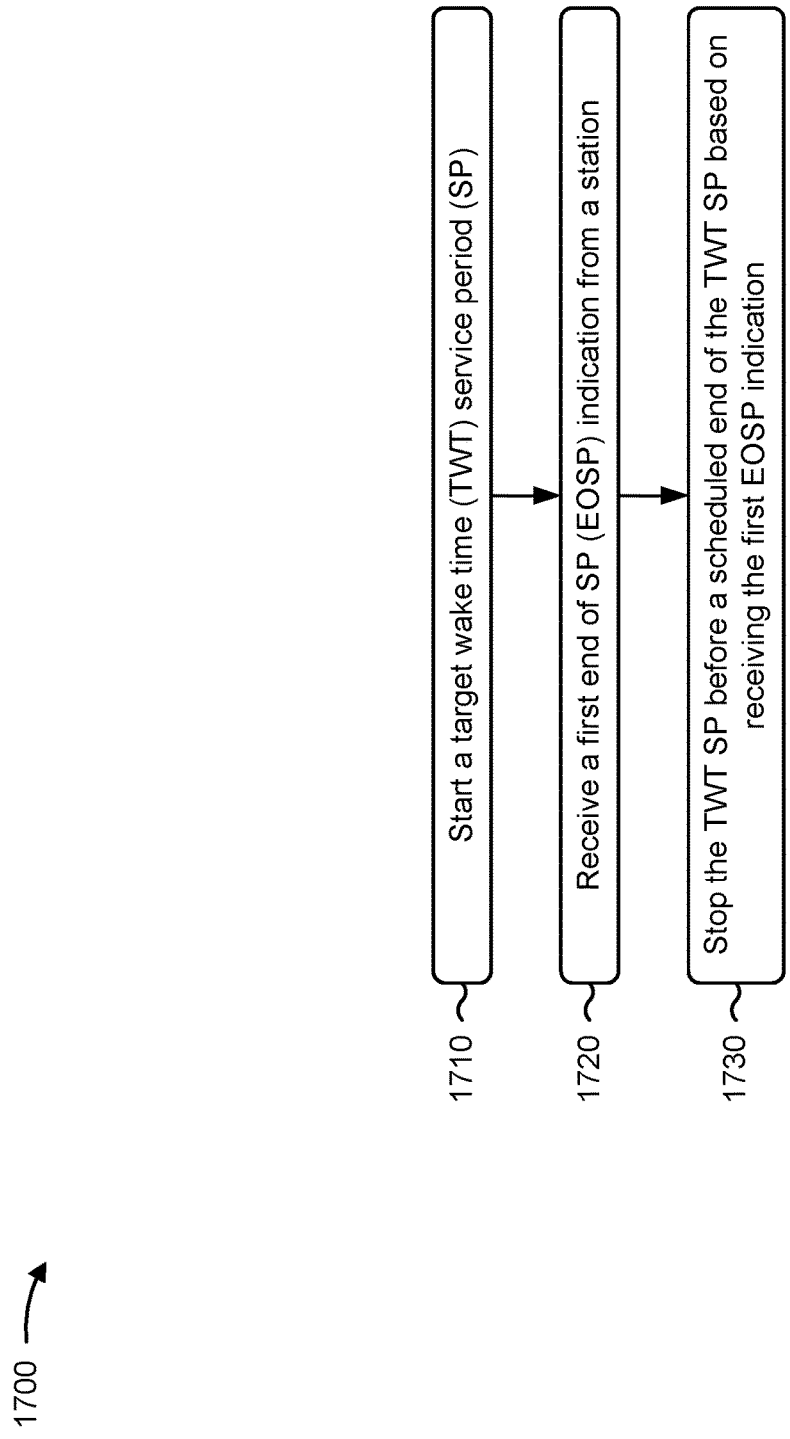
FIG. 17 is a diagram illustrating an example process performed, for example, by an access point, in accordance with the present disclosure.

FIG. 17 is a diagram illustrating an example process 1700 performed, for example, by an access point, in accordance with the present disclosure. Example process 1700 is an example where the access point (e.g., SAP 810) performs operations associated with reverse EOSP indications.

As shown in FIG. 17, in some aspects, process 1700 may include starting a TWT SP (block 1710). For example, the access point (e.g., using communication manager 1908 and/or service period component 1910 depicted in FIG. 19) may start a TWT SP, as described above.

As further shown in FIG. 17, in some aspects, process 1700 may include receiving a first EOSP indication from a station (block 1720). For example, the access point (e.g., using communication manager 1908 and/or reception component 1902 depicted in FIG. 19) may receive a first EOSP indication from a station, as described above.

As further shown in FIG. 17, in some aspects, process 1700 may include stopping the TWT SP before a scheduled end of the TWT SP based on receiving the first EOSP indication (block 1730). For example, the access point (e.g., using communication manager 1908 and/or service period component 1910 depicted in FIG. 19) may stop the TWT SP before a scheduled end of the TWT SP based on receiving the first EOSP indication, as described above.

Process 1700 may include additional aspects, such as any single aspect or any combination of aspects described below and/or in connection with one or more other processes described elsewhere herein.

In a first aspect, receiving the first EOSP indication includes receiving the first EOSP indication in a frame shared with an ACK, BA, or MBA.

In a second aspect, alone or in combination with the first aspect, receiving the first EOSP indication includes receiving the first EOSP indication multiplexed with an ACK, BA, or MBA.

In a third aspect, alone or in combination with one or more of the first and second aspects, receiving the first EOSP indication includes receiving the first EOSP indication in a frame shared with or configured for a QoS null message.

In a fourth aspect, alone or in combination with one or more of the first through third aspects, receiving the first EOSP indication includes receiving the first EOSP indication in a frame shared with or configured for a QoS data message.

In a fifth aspect, alone or in combination with one or more of the first through fourth aspects, the QoS data message is associated with an XR application or a PAN application.

In a sixth aspect, alone or in combination with one or more of the first through fifth aspects, receiving the first EOSP indication includes receiving the first EOSP indication in a frame that is separate from a QoS message, an ACK, BA, or MBA.

In a seventh aspect, alone or in combination with one or more of the first through sixth aspects, process 1700 includes entering a sleep state or refraining from transmission or reception between reception of the first EOSP indication and a scheduled end of the TWT SP.

In an eighth aspect, alone or in combination with one or more of the first through seventh aspects, process 1700 includes remaining in the sleep state or further refraining from transmission or reception between the scheduled end of the TWT SP and a start of a next TWT SP.

In a ninth aspect, alone or in combination with one or more of the first through eighth aspects, process 1700 includes serving an off-channel or concurrent mode of operation between reception of the first EOSP indication and a scheduled end of the TWT SP.

In a tenth aspect, alone or in combination with one or more of the first through ninth aspects, process 1700 includes further serving the off-channel or concurrent mode of operation between the scheduled end of the TWT SP and a start of a next TWT SP.

In an eleventh aspect, alone or in combination with one or more of the first through tenth aspects, receiving the first EOSP indication includes receiving the first EOSP indication at a service application of the access point.

In a twelfth aspect, alone or in combination with one or more of the first through eleventh aspects, receiving the first EOSP indication includes receiving the first EOSP indication via a configured component.

In a thirteenth aspect, alone or in combination with one or more of the first through twelfth aspects, process 1700 includes receiving a second EOSP indication, wherein stopping the TWT SP includes stopping the TWT SP based on receiving both the first EOSP indication and the second EOSP indication.

In a fourteenth aspect, alone or in combination with one or more of the first through thirteenth aspects, process 1700 includes receiving an EOSP indication from each station connected to the access point and associated with the TWT SP, where stopping the TWT SP includes stopping the TWT SP based on receiving an EOSP indication from all stations connected to the access point and associated with the TWT SP.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
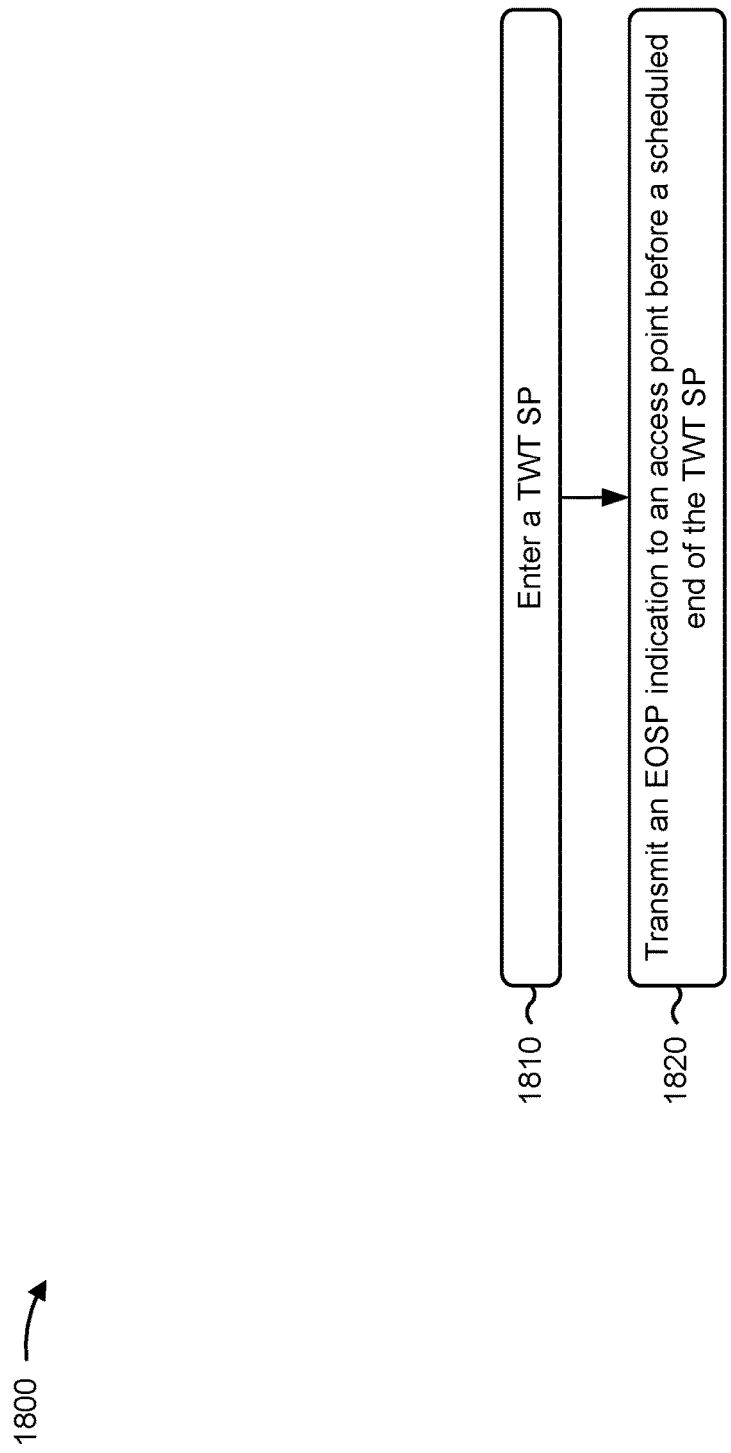
FIG. 18 is a diagram illustrating an example process performed, for example, by a station, in accordance with the present disclosure.

FIG. 18 is a diagram illustrating an example process 1800 performed, for example, by a station, in accordance with the present disclosure. Example process 1800 is an example where the station (e.g., STA 820) performs operations associated with reverse EOSP indications.

As shown in FIG. 18, in some aspects, process 1800 may include entering a TWT SP (block 1810). For example, the station (e.g., using communication manager 2008 and/or service period component 2010 depicted in FIG. 20) may enter a TWT SP, as described above.

As further shown in FIG. 18, in some aspects, process 1800 may include transmitting an EOSP indication to an access point before a scheduled end of the TWT SP (block 1820). For example, the station (e.g., using communication manager 2008 and/or transmission component 2004 depicted in FIG. 20) may transmit an EOSP indication to an access point before a scheduled end of the TWT SP, as described above.

Process 1800 may include additional aspects, such as any single aspect or any combination of aspects described below and/or in connection with one or more other processes described elsewhere herein.

In a first aspect, transmitting the EOSP indication includes transmitting the EOSP indication based on no data being ready for transmission.

In a second aspect, alone or in combination with the first aspect, process 1800 includes receiving a forward EOSP indication, and stopping the TWT SP based on receiving the forward EOSP indication.

In a third aspect, alone or in combination with one or more of the first and second aspects, transmitting the EOSP indication includes transmitting the EOSP indication in a frame shared with an Ack, BA, or MBA.

In a fourth aspect, alone or in combination with one or more of the first through third aspects, transmitting the EOSP indication includes transmitting the EOSP indication multiplexed with an ACK, BA, or MBA.

In a fifth aspect, alone or in combination with one or more of the first through fourth aspects, transmitting the EOSP indication includes transmitting the EOSP indication in a frame shared with or configured for a QoS null message.

In a sixth aspect, alone or in combination with one or more of the first through fifth aspects, transmitting the EOSP indication includes transmitting the EOSP indication in a frame shared with or configured for a QoS data message.

In a seventh aspect, alone or in combination with one or more of the first through sixth aspects, the frame is a last frame for which there is data.

In an eighth aspect, alone or in combination with one or more of the first through seventh aspects, the data is associated with an extended reality application or a personal area network application.

In a ninth aspect, alone or in combination with one or more of the first through eighth aspects, transmitting the EOSP indication includes transmitting the EOSP indication in a frame that is separate from a QoS message, an ACK, BA, or MBA.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
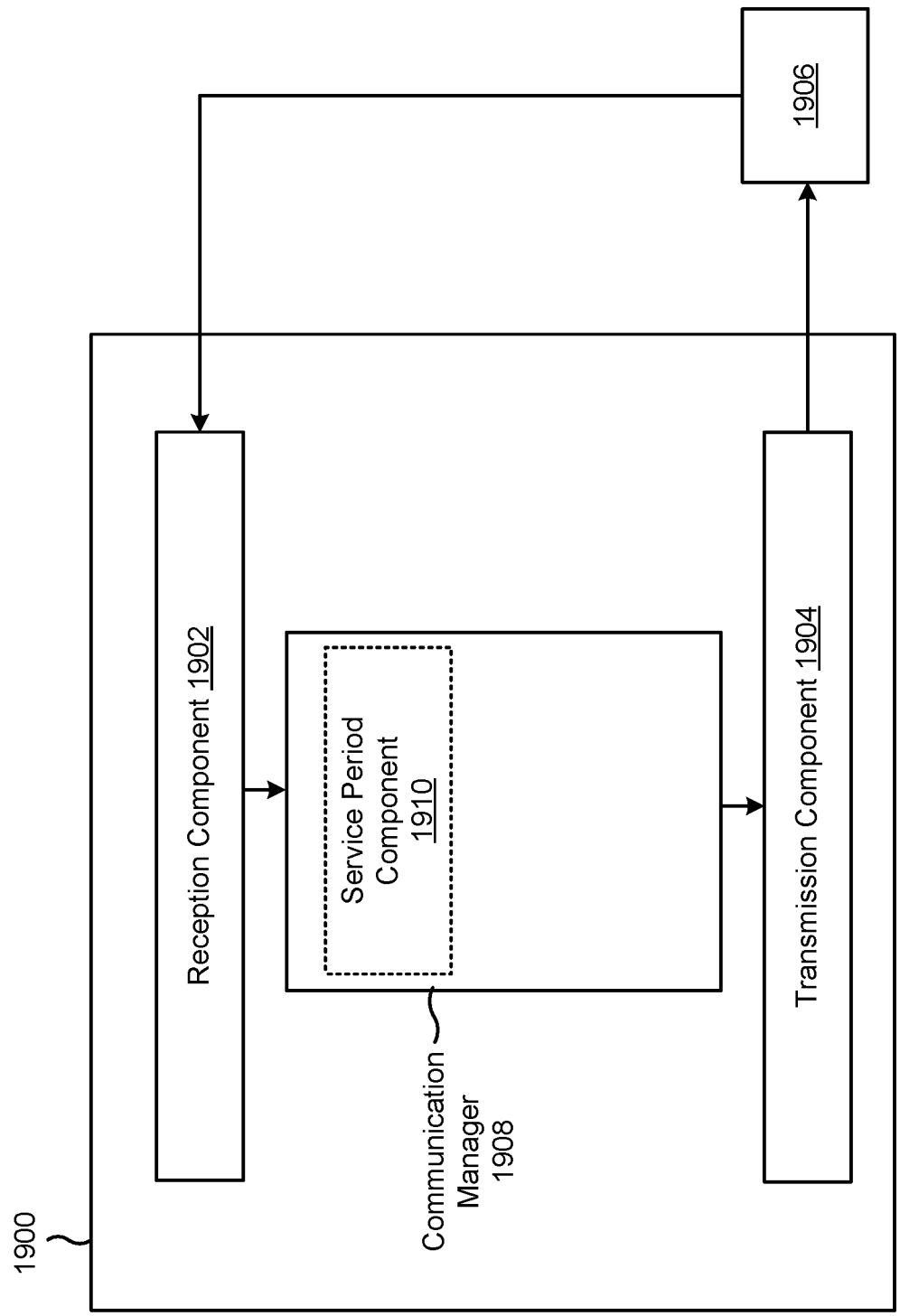
FIGS. 19-20 are diagrams of example apparatuses for wireless communication, in accordance with the present disclosure.

FIG. 19 is a diagram of an example apparatus 1900 for wireless communication. The apparatus 1900 may be an access point (e.g., AP 120, SAP 810), or an access point may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, network entity, station, access point, or another wireless communication device) using the reception component 1902 and the transmission component 1904. As further shown, the apparatus 1900 may include the communication manager 1908. The communication manager 1908 may control and/or otherwise manage one or more operations of the reception component 1902 and/or the transmission component 1904. In some aspects, the communication manager 1908 may include one or more antennas, a modem, a controller/processor, a memory, or a combination thereof, of the AP described in connection with FIG. 1C. The communication manager 1908 may be, or be similar to, the communication manager 132 depicted in FIG. 1C. For example, in some aspects, the communication manager 1908 may be configured to perform one or more of the functions described as being performed by the communication manager 132. In some aspects, the communication manager 1908 may include the reception component 1902 and/or the transmission component 1904. The communication manager 1908 may include a service period component 1910, among other examples.

In some aspects, the apparatus 1900 may be configured to perform one or more operations described herein in connection with FIGS. 1-16. Additionally, or alternatively, the apparatus 1900 may be configured to perform one or more processes described herein, such as process 1700 of FIG. 17. In some aspects, the apparatus 1900 and/or one or more components shown in FIG. 19 may include one or more components of the access point described in connection with FIG. 1C. Additionally, or alternatively, one or more components shown in FIG. 19 may be implemented within one or more components described in connection with FIG. 1C. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the access point described in connection with FIG. 1C.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modem, a modulator, a transmit MIMO processor, a transmit processor, a controller/processor, a memory, or a combination thereof, of the access point described in connection with FIG. 1C. In some aspects, the transmission component 1904 may be co-located with the reception component 1902 in a transceiver.

The service period component 1910 may start a TWT SP. The reception component 1902 may receive a first EOSP indication from a station. The service period component 1910 may stop the TWT SP before a scheduled end of the TWT SP based on receiving the first EOSP indication.

The transmission component 1904 and the reception component 1902 may enter a sleep state or refraining from transmission or reception between reception of the first EOSP indication and a scheduled end of the TWT SP. The transmission component 1904 and the reception component 1902 may remain in the sleep state or further refraining from transmission or reception between the scheduled end of the TWT SP and a start of a next TWT SP.

The apparatus 1900 may serve an off-channel or concurrent mode of operation between reception of the first EOSP indication and a scheduled end of the TWT SP. The apparatus 1900 may further serve the off-channel or concurrent mode of operation between the scheduled end of the TWT SP and a start of a next TWT SP.

The reception component 1902 may receive a second EOSP indication, wherein stopping the TWT SP includes stopping the TWT SP based on receiving both the first EOSP indication and the second EOSP indication. The reception component 1902 may receive an EOSP indication from each station connected to the access point and associated with the TWT SP, where stopping the TWT SP includes stopping the TWT SP based on receiving an EOSP indication from all stations connected to the access point and associated with the TWT SP.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
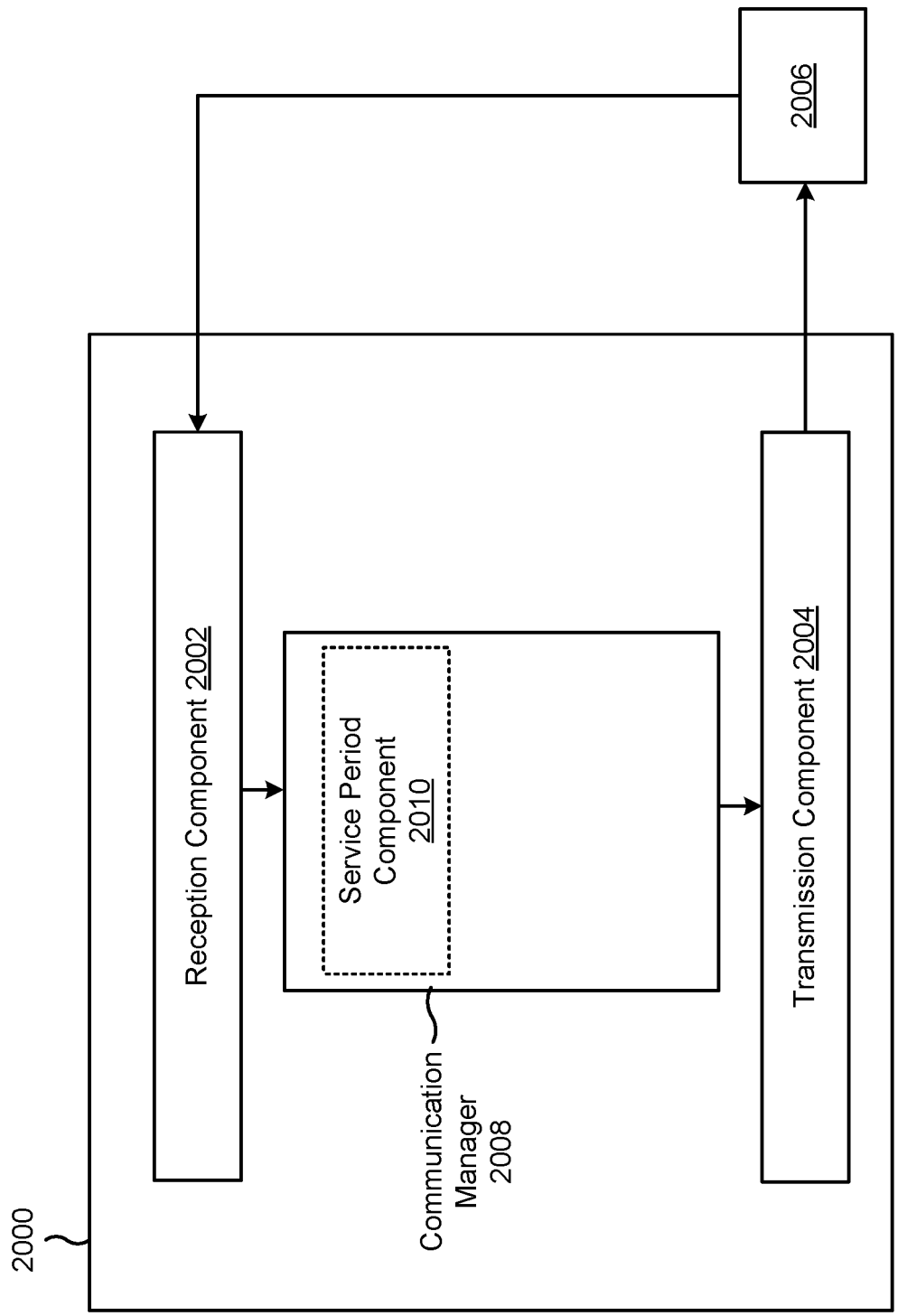

FIG. 20 is a diagram of an example apparatus 2000 for wireless communication. The apparatus 2000 may be a station (e.g., STA 140, STA 820), or a station may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, network entity, access point, station, or another wireless communication device) using the reception component 2002 and the transmission component 2004. As further shown, the apparatus 2000 may include the communication manager 2008. The communication manager 2008 may control and/or otherwise manage one or more operations of the reception component 2002 and/or the transmission component 2004. In some aspects, the communication manager 2008 may include one or more antennas, a modem, a controller/processor, a memory, or a combination thereof, of the STA described in connection with FIG. 1D. The communication manager 2008 may be, or be similar to, the communication manager 56 depicted in FIG. 1D. For example, in some aspects, the communication manager 2008 may be configured to perform one or more of the functions described as being performed by the communication manager 156. In some aspects, the communication manager 2008 may include the reception component 2002 and/or the transmission component 2004. The communication manager 2008 may include a service period component 2010, among other examples.

In some aspects, the apparatus 2000 may be configured to perform one or more operations described herein in connection with FIGS. 1-16. Additionally, or alternatively, the apparatus 2000 may be configured to perform one or more processes described herein, such as process 1800 of FIG. 18. In some aspects, the apparatus 2000 and/or one or more components shown in FIG. 20 may include one or more components of the station described in connection with FIG. 1D. Additionally, or alternatively, one or more components shown in FIG. 20 may be implemented within one or more components described in connection with FIG. 1D. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, a modem, a demodulator, a MIMO detector, a receive processor, a controller/processor, a memory, or a combination thereof, of the station described in connection with FIG. 1D.

The transmission component 2004 may transmit communications, such as reference signals, control information, data communications, or a combination thereof, to the apparatus 2006. In some aspects, one or more other components of the apparatus 2000 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modem, a modulator, a transmit MIMO processor, a transmit processor, a controller/processor, a memory, or a combination thereof, of the station described in connection with FIG. 1D. In some aspects, the transmission component 2004 may be co-located with the reception component 2002 in a transceiver.

The service period component 2010 may enter a TWT SP. The transmission component 2004 may transmit an EOSP indication to an access point before a scheduled end of the TWT SP. The reception component 2002 may receive a forward EOSP indication. The service period component 2010 may stop the TWT SP based on receiving the forward EOSP indication.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

The following provides an overview of some Aspects of the present disclosure:

Aspect 1: A method of wireless communication performed by an access point, comprising: starting a target wake time (TWT) service period (SP); receiving a first end of SP (EOSP) indication from a station; and stopping the TWT SP before a scheduled end of the TWT SP based on receiving the first EOSP indication.

Aspect 2: The method of Aspect 1, wherein receiving the first EOSP indication includes receiving the first EOSP indication in a frame shared with an acknowledgement, a block acknowledgement, or a multi-block acknowledgement.

Aspect 3: The method of Aspect 1 or 2, wherein receiving the first EOSP indication includes receiving the first EOSP indication multiplexed with an acknowledgement, a block acknowledgement, or a multi-block acknowledgement.

Aspect 4: The method of any of Aspects 1-3, wherein receiving the first EOSP indication includes receiving the first EOSP indication in a frame shared with or configured for a quality of service null message.

Aspect 5: The method of any of Aspects 1-3, wherein receiving the first EOSP indication includes receiving the first EOSP indication in a frame shared with or configured for a quality of service data message.

Aspect 6: The method of Aspect 5, wherein the quality of service data message is associated with an extended reality application or a personal area network application.

Aspect 7: The method of Aspect 1, wherein receiving the first EOSP indication includes receiving the first EOSP indication in a frame that is separate from a quality of service message, an acknowledgement, a block acknowledgement, or a multi-block acknowledgement.

Aspect 8: The method of any of Aspects 1-7, further comprising entering a sleep state or refraining from transmission or reception between reception of the first EOSP indication and the scheduled end of the TWT SP.

Aspect 9: The method of Aspect 8, further comprising remaining in the sleep state or further refraining from transmission or reception between the scheduled end of the TWT SP and a start of a next TWT SP.

Aspect 10: The method of any of Aspects 1-9, further comprising serving an off-channel or concurrent mode of operation between reception of the first EOSP indication and the scheduled end of the TWT SP.

Aspect 11: The method of Aspect 10, further comprising further serving the off-channel or concurrent mode of operation between the scheduled end of the TWT SP and a start of a next TWT SP.

Aspect 12: The method of any of Aspects 1-11, wherein receiving the first EOSP indication includes receiving the first EOSP indication at a service application of the access point.

Aspect 13: The method of any of Aspects 1-12, wherein receiving the first EOSP indication includes receiving the first EOSP indication via a configured component.

Aspect 14: The method of any of Aspects 1-13, further comprising receiving a second EOSP indication, wherein stopping the TWT SP includes stopping the TWT SP based on receiving both the first EOSP indication and the second EOSP indication.

Aspect 15: The method of any of Aspects 1-14, further comprising receiving an EOSP indication from each station connected to the access point and associated with the TWT SP, wherein stopping the TWT SP includes stopping the TWT SP based on receiving an EOSP indication from all stations connected to the access point and associated with the TWT SP.

Aspect 16: A method of wireless communication performed by a station, comprising: entering a target wake time (TWT) service period (SP); and transmitting an EOSP indication to an access point before a scheduled end of the TWT SP.

Aspect 17: The method of Aspect 16, wherein transmitting the EOSP indication includes transmitting the EOSP indication based on no data being ready for transmission.

Aspect 18: The method of Aspect 16 or 17, further comprising: receiving a forward EOSP indication; and stopping the TWT SP based on receiving the forward EOSP indication.

Aspect 19: The method of any of Aspects 16-18, wherein transmitting the EOSP indication includes transmitting the EOSP indication in a frame shared with an acknowledgement, a block acknowledgement, or a multi-block acknowledgement.

Aspect 20: The method of any of Aspects 16-19, wherein transmitting the EOSP indication includes transmitting the EOSP indication multiplexed with an acknowledgement, a block acknowledgement, or a multi-block acknowledgement.

Aspect 21: The method of any of Aspects 16-20, wherein transmitting the EOSP indication includes transmitting the EOSP indication in a frame shared with or configured for a quality of service null message.

Aspect 22: The method of any of Aspects 16-21, wherein transmitting the EOSP indication includes transmitting the EOSP indication in a frame shared with or configured for a quality of service data message.

Aspect 23: The method of Aspect 22, wherein the frame is a last frame for which there is data.

Aspect 24: The method of Aspect 23, wherein the data is associated with an extended reality application or a personal area network application.

Aspect 25: The method of any of Aspects 16-18 and 24, wherein transmitting the EOSP indication includes transmitting the EOSP indication in a frame that is separate from a quality of service message, an acknowledgement, a block acknowledgement, or a multi-block acknowledgement.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An access point for wireless communication, comprising:
   one or more memories; and
   one or more processors, coupled to the one or more memories, configured to:
   start a target wake time (TWT) service period (SP);
   receive a first end of SP (EOSP) indication from a station;
   stop the TWT SP before a scheduled end of the TWT SP based on receiving the first EOSP indication; and
   enter a sleep state or refrain from transmission or reception between receiving the first EOSP indication from the station and the scheduled end of the TWT SP.

2. The access point of claim 1, wherein the one or more processors, to receive the first EOSP indication, are configured to receive the first EOSP indication in a frame shared with an acknowledgement, a block acknowledgement, or a multi-block acknowledgement.

3. The access point of claim 1, wherein the one or more processors, to receive the first EOSP indication, are configured to receive the first EOSP indication multiplexed with an acknowledgement, a block acknowledgement, or a multi-block acknowledgement.

4. The access point of claim 1, wherein the one or more processors, to receive the first EOSP indication, are configured to receive the first EOSP indication in a frame shared with or configured for a quality of service null message.

5. The access point of claim 1, wherein the one or more processors, to receive the first EOSP indication, are configured to receive the first EOSP indication in a frame shared with or configured for a quality of service data message.

6. The access point of claim 5, wherein the quality of service data message is associated with an extended reality application or a personal area network application.

7. The access point of claim 1, wherein the one or more processors, to receive the first EOSP indication, are configured to receive the first EOSP indication in a frame that is separate from a quality of service message, an acknowledgement, a block acknowledgement, or a multi-block acknowledgement.

8. The access point of claim 1, wherein the one or more processors are configured to remain in the sleep state or further refrain from transmission or reception between the scheduled end of the TWT SP and a start of a next TWT SP.

9. The access point of claim 1, wherein the one or more processors are configured to serve an off-channel or concurrent mode of operation between reception of the first EOSP indication and the scheduled end of the TWT SP.

10. The access point of claim 9, wherein the one or more processors are configured to further serve the off-channel or the concurrent mode of operation between the scheduled end of the TWT SP and a start of a next TWT SP.

11. The access point of claim 1, wherein the one or more processors, to receive the first EOSP indication, are configured to receive the first EOSP indication at a service application of the access point.

12. The access point of claim 1, wherein the one or more processors, to receive the first EOSP indication, are configured to receive the first EOSP indication via a configured component.

13. The access point of claim 1, wherein the one or more processors are configured to receive a second EOSP indication from a second station, and wherein the one or more processors, to stop the TWT SP, are configured to stop the TWT SP based on receiving both the first EOSP indication from the station and the second EOSP indication from the second station.

14. The access point of claim 1, wherein the one or more processors are configured to receive an EOSP indication from each station connected to the access point and associated with the TWT SP, and wherein the one or more processors, to stop the TWT SP, are configured to stop the TWT SP based on reception of an EOSP indication from all stations connected to the access point and associated with the TWT SP.

15. A station for wireless communication, comprising:
one or more memories; and
one or more processors, coupled to the one or more memories, configured to:
enter a target wake time (TWT) service period (SP); and
transmit, from the station to an access point before a scheduled end of the TWT SP, an end of SP (EOSP) indication in a frame shared with an acknowledgement, a block acknowledgement, or a multi-block acknowledgement.

16. The station of claim 15, wherein the one or more processors, to transmit the EOSP indication, are configured to transmit the EOSP indication based on no data being ready for transmission.

17. The station of claim 15, wherein the one or more processors are configured to:
receive a forward EOSP indication; and
stop the TWT SP based on receiving the forward EOSP indication.

18. The station of claim 15, wherein the one or more processors, to transmit the EOSP indication, are configured to transmit the EOSP indication multiplexed with the acknowledgement, the block acknowledgement, or the multi-block acknowledgement.

19. The station of claim 15, wherein the frame is further shared with or configured for a quality of service null message.

20. The station of claim 15, wherein the frame is further shared with or configured for a quality of service data message.

21. The station of claim 20, wherein the frame is a last frame for which there is data.

22. The station of claim 21, wherein the data is associated with an extended reality application or a personal area network application.

23. A method of wireless communication performed by an access point, comprising:
starting a target wake time (TWT) service period (SP);
receiving a first end of SP (EOSP) indication from a station;
stopping the TWT SP before a scheduled end of the TWT SP based on receiving the first EOSP indication; and
entering a sleep state or refraining from transmission or reception between receiving the first EOSP indication from the station and the scheduled end of the TWT SP.

24. The method of claim 23, wherein receiving the first EOSP indication includes receiving the first EOSP indication in a frame shared with a quality of service null message, a quality of service data message, or an acknowledgment.

25. The method of claim 23, wherein receiving the first EOSP indication includes receiving the first EOSP indication in a frame that is separate from a quality of service message, an acknowledgement, a block acknowledgement, or a multi-block acknowledgement.

26. A method of wireless communication performed by a station, comprising:
entering a target wake time (TWT) service period (SP); and
transmitting, from the station to an access point before a scheduled end of the TWT SP, an end of SP (EOSP) indication in a frame shared with an acknowledgement, a block acknowledgement, or a multi-block acknowledgement.

27. The method of claim 26, wherein the frame is further shared with a quality of service null message or a quality of service data message.

28. The method of claim 23, further comprising:
receiving a second EOSP indication from a second station, wherein stopping the TWT SP is based on receiving both the first EOSP indication from the station and the second EOSP indication from the second station.

29. The method of claim 26, wherein transmitting the EOSP indication is based on no data being ready for transmission.

30. The method of claim 26, further comprising:
 receiving a forward EOSP indication based on transmitting the EOSP indication to the access point; and
 stopping the TWT SP based on receiving the forward EOSP indication.

\* \* \* \* \*